US011996664B2

(12) United States Patent
Cutsforth et al.

(10) Patent No.: US 11,996,664 B2
(45) Date of Patent: May 28, 2024

(54) BRUSH HOLDER ASSEMBLY

(71) Applicant: CUTSFORTH, INC., Minneapolis, MN (US)

(72) Inventors: Robert S. Cutsforth, Bellingham, WA (US); Kurtis Jeremy Schultz, Bellingham, WA (US)

(73) Assignee: CUTSFORTH, INC., Minneapolis, MN (US)

( * ) Notice: Subject to any disclaimer, the term of this patent is extended or adjusted under 35 U.S.C. 154(b) by 13 days.

(21) Appl. No.: 17/538,400

(22) Filed: Nov. 30, 2021

(65) Prior Publication Data

US 2022/0173562 A1 Jun. 2, 2022

Related U.S. Application Data

(60) Provisional application No. 63/243,314, filed on Sep. 13, 2021, provisional application No. 63/119,803, filed on Dec. 1, 2020.

(51) Int. Cl.
*H01R 39/38* (2006.01)
*H01R 39/36* (2006.01)
*H02K 13/00* (2006.01)

(52) U.S. Cl.
CPC ........... *H01R 39/383* (2013.01); *H01R 39/36* (2013.01); *H02K 13/003* (2013.01)

(58) Field of Classification Search
CPC ...... H01R 39/38; H01R 39/383; H01R 39/36; H02K 13/00; H02K 13/003
See application file for complete search history.

(56) References Cited

U.S. PATENT DOCUMENTS

| 629,418 | A | 7/1899 | Baylis |
|---|---|---|---|
| 985,951 | A | 3/1911 | Sparks |
| 1,132,304 | A | 3/1915 | Cunningham |

(Continued)

FOREIGN PATENT DOCUMENTS

| CN | 108254988 A | * | 7/2018 | ....... G02F 1/136259 |
|---|---|---|---|---|
| CN | 211295649 U | | 8/2020 | |

(Continued)

OTHER PUBLICATIONS

English translation of FR-2908245-A1 (Year: 2008).*

(Continued)

*Primary Examiner* — Tulsidas C Patel
*Assistant Examiner* — Joshua Kiel M Rodriguez
(74) *Attorney, Agent, or Firm* — Seager, Tufte & Wickhem LLP

(57) ABSTRACT

A brush assembly for use in a brush holder assembly of an electrical machine is disclosed. The brush assembly includes a carbon brush, an electrically conductive terminal and an electrically conductive lead assembly attached to both the carbon brush and the electrically conductive terminal. In some instances, the electrically conductive lead assembly includes a spliced union located between the electrically conductive terminal and the carbon brush and spaced away from both the electrically conductive terminal and the carbon brush. In some instances, the electrically conductive terminal includes an inner core layer positioned between a first conductive metal layer and a second conductive metal layer.

18 Claims, 23 Drawing Sheets

(56) References Cited

U.S. PATENT DOCUMENTS

| | | |
|---|---|---|
| 1,355,254 A | 10/1920 | Parsons |
| 1,366,404 A | 1/1921 | MacDougall |
| 1,488,574 A | 4/1924 | Wagner |
| 1,488,575 A | 4/1924 | Wagner |
| 2,194,620 A | 3/1940 | Sekyra |
| 2,840,732 A | 6/1958 | Nottelmann et al. |
| 2,840,734 A | 6/1958 | Nottelmann et al. |
| 3,316,431 A | 4/1967 | Manoni |
| 3,346,431 A | 10/1967 | Hammonds |
| 3,387,155 A | 6/1968 | Krulls |
| 3,432,708 A | 3/1969 | Bissett |
| 3,445,705 A | 5/1969 | Fuller et al. |
| 3,466,481 A | 9/1969 | Sckerl |
| 3,482,135 A | 12/1969 | Hurlin |
| 3,521,102 A | 7/1970 | Kumar |
| 3,590,298 A | 6/1971 | Hudak |
| 3,656,018 A | 4/1972 | Maher |
| 3,710,160 A | 1/1973 | Voglesonger |
| 3,710,478 A | 1/1973 | Krulls et al. |
| 3,842,302 A | 10/1974 | Apostoleris |
| 3,863,085 A | 1/1975 | Shapiro et al. |
| 3,864,803 A | 2/1975 | Ohmstedt et al. |
| 3,867,659 A | 2/1975 | Seaburg |
| 3,898,492 A | 8/1975 | Vassos et al. |
| 3,902,088 A | 8/1975 | Guglielmo |
| 3,967,148 A | 6/1976 | Walsh |
| 3,968,391 A | 7/1976 | Blank |
| 3,983,432 A | 9/1976 | Rankin |
| 4,074,162 A | 2/1978 | Parzych |
| 4,082,975 A | 4/1978 | Azarov et al. |
| 4,166,968 A | 9/1979 | Prittie |
| 4,296,346 A | 10/1981 | Ooki et al. |
| 4,297,605 A | 10/1981 | Tak |
| 4,329,611 A | 5/1982 | Ohmstedt et al. |
| 4,329,612 A | 5/1982 | Averill |
| 4,340,832 A | 7/1982 | Cheetham et al. |
| 4,354,128 A | 10/1982 | Chew et al. |
| 4,355,254 A | 10/1982 | Oki et al. |
| 4,366,404 A | 12/1982 | Ziegler |
| 4,409,508 A | 10/1983 | Ooki et al. |
| 4,420,705 A | 12/1983 | Kimberlin |
| 4,513,395 A | 4/1985 | Henry et al. |
| 4,513,495 A | 4/1985 | Kimberlin |
| 4,633,552 A | 1/1987 | Eriksson |
| 4,663,552 A | 5/1987 | Ohmstedt |
| 4,843,274 A | 6/1989 | Paisley |
| 4,985,654 A * | 1/1991 | Morikane ............ H02K 5/225 310/239 |
| 5,043,619 A | 8/1991 | Kartman, Jr. |
| 5,159,222 A | 10/1992 | Southall |
| 5,168,620 A | 12/1992 | Denney et al. |
| 5,256,925 A | 10/1993 | Cutsforth |
| 5,414,319 A | 5/1995 | Nowicki et al. |
| 5,444,320 A | 8/1995 | Clarke et al. |
| 5,608,280 A | 3/1997 | Tamemoto et al. |
| 5,648,695 A | 7/1997 | Yamaguchi et al. |
| 5,731,650 A | 3/1998 | Scheucher |
| 5,819,092 A | 10/1998 | Ferguson et al. |
| 5,939,812 A | 8/1999 | Wetzel |
| 5,949,175 A | 9/1999 | Cummins |
| 6,087,754 A | 7/2000 | Berger |
| 6,124,652 A | 9/2000 | Karasa et al. |
| 6,133,665 A | 10/2000 | Prell et al. |
| 6,169,351 B1 | 1/2001 | Bohart et al. |
| 6,246,145 B1 | 6/2001 | Morimoto et al. |
| 6,246,146 B1 | 6/2001 | Schiller |
| 6,255,955 B1 | 7/2001 | Blaettner |
| 6,326,716 B1 | 12/2001 | Niimi et al. |
| 6,356,004 B1 | 3/2002 | Porter et al. |
| 6,515,989 B1 | 2/2003 | Rönneke |
| 6,600,744 B1 | 7/2003 | Carr et al. |
| 6,618,355 B1 | 9/2003 | Gulliford et al. |
| 6,636,502 B1 | 10/2003 | Lager et al. |
| 6,680,556 B2 | 1/2004 | Menz et al. |
| 6,738,752 B2 | 5/2004 | Sako et al. |
| 6,824,577 B2 | 11/2004 | Deshpande |
| 6,960,922 B2 | 11/2005 | Klaar |
| 7,034,430 B2 * | 4/2006 | Custforth ............ H01R 39/381 310/239 |
| 7,053,516 B2 | 5/2006 | Yu |
| 7,122,935 B2 | 10/2006 | Custforth et al. |
| 7,141,906 B2 | 11/2006 | Custforth et al. |
| 7,218,028 B2 | 5/2007 | Annis et al. |
| 7,365,470 B1 | 4/2008 | Eger et al. |
| 7,417,354 B2 | 8/2008 | Cutsforth et al. |
| 7,545,072 B2 | 6/2009 | Cutsforth |
| 7,564,160 B2 | 7/2009 | Cutsforth et al. |
| 7,608,970 B2 | 10/2009 | Eger et al. |
| 7,705,744 B2 | 4/2010 | Cutsforth |
| 7,768,174 B2 | 8/2010 | Cutsforth et al. |
| 7,816,834 B2 | 10/2010 | Cutsforth |
| 7,880,362 B2 | 2/2011 | Cutsforth et al. |
| 7,880,363 B2 | 2/2011 | Cutsforth et al. |
| 7,916,038 B2 | 3/2011 | Cutsforth |
| 7,960,892 B2 | 6/2011 | Cutsforth |
| 7,990,018 B2 | 8/2011 | Cutsforth et al. |
| 7,994,683 B2 | 8/2011 | Cutsforth et al. |
| 8,049,392 B2 | 11/2011 | Quail et al. |
| 8,134,472 B2 | 3/2012 | Cutsforth |
| 8,179,014 B2 | 5/2012 | Cutsforth et al. |
| 8,546,993 B2 | 10/2013 | Cutsforth et al. |
| 8,618,943 B2 | 12/2013 | Cutsforth et al. |
| 8,825,800 B2 | 9/2014 | Cutsforth |
| 8,922,092 B2 | 12/2014 | Cutsforth |
| 9,178,327 B2 | 11/2015 | Cutsforth |
| 9,252,643 B2 | 2/2016 | Cutsforth |
| 9,287,674 B2 | 3/2016 | Cutsforth et al. |
| 9,287,675 B2 | 3/2016 | Cutsforth et al. |
| 9,287,676 B2 | 3/2016 | Cutsforth et al. |
| 9,293,879 B2 | 3/2016 | Cutsforth et al. |
| 9,293,880 B2 | 3/2016 | Cutsforth et al. |
| 9,293,881 B2 | 3/2016 | Cutsforth et al. |
| 9,350,130 B2 | 5/2016 | Cutsforth et al. |
| 9,590,375 B2 | 3/2017 | Cutsforth et al. |
| 9,590,376 B2 | 3/2017 | Cutsforth |
| 9,640,930 B2 | 5/2017 | Cutsforth |
| 9,917,408 B2 | 3/2018 | Cutsforth |
| 10,173,280 B1 * | 1/2019 | Berube ............... B23K 9/1012 |
| 10,199,790 B2 | 2/2019 | Cutsforth et al. |
| 10,249,999 B2 | 4/2019 | Cutsforth |
| RE47,563 E | 8/2019 | Cutsforth |
| 10,790,629 B2 | 9/2020 | Cutsforth |
| 11,211,757 B2 | 12/2021 | Cutsforth et al. |
| 2001/0006311 A1 * | 7/2001 | Niimi .................... H01R 39/46 310/249 |
| 2003/0151328 A1 | 8/2003 | Cutsforth et al. |
| 2003/0173856 A1 | 9/2003 | Raye et al. |
| 2005/0156477 A1 | 7/2005 | Bocka et al. |
| 2006/0112584 A1 | 6/2006 | Jones |
| 2006/0119211 A1 | 6/2006 | Annis et al. |
| 2010/0133950 A1 | 6/2010 | Custforth et al. |
| 2015/0137656 A1 | 2/2015 | Cutsforth et al. |
| 2015/0137657 A1 | 2/2015 | Cutsforth et al. |
| 2015/0143689 A1 | 5/2015 | Cutsforth et al. |
| 2015/0171583 A1 | 6/2015 | Cutsforth et al. |
| 2015/0180191 A1 | 6/2015 | Cutsforth et al. |
| 2015/0180318 A1 | 6/2015 | Cutsforth et al. |
| 2020/0112223 A1 | 4/2020 | Cutsforth et al. |
| 2020/0388974 A1 | 12/2020 | Cutsforth |

FOREIGN PATENT DOCUMENTS

| | | | |
|---|---|---|---|
| DE | 19943306 A1 | 4/2000 | |
| EP | 847126 A1 | 6/1998 | |
| EP | 1026853 A1 | 8/2000 | |
| EP | 2639897 A2 | 9/2013 | |
| FR | 2246994 A1 | 5/1975 | |
| FR | 2329087 A1 | 5/1977 | |
| FR | 2908245 A1 | 5/2008 | |
| FR | 2908245 A1 * | 5/2008 | ........... H01R 39/383 |
| GB | 1331468 A * | 9/1973 | ............. H01R 39/36 |
| JP | S50-54808 A * | 5/1975 | ............. H01R 39/18 |
| JP | H1013808 A | 1/1998 | |
| JP | H1166182 A | 3/1999 | |

(56) References Cited

FOREIGN PATENT DOCUMENTS

| JP | H1174882 | A | 3/1999 |
| JP | 2000101573 | A | 4/2000 |
| JP | 2001067401 | A | 3/2001 |
| JP | S5054808 | A | 4/2006 |
| WO | 0133800 | A1 | 5/2001 |
| WO | 0191003 | A2 | 11/2001 |

OTHER PUBLICATIONS

International Search Report and Written Opinion dated Mar. 23, 2022 for International Application No. PCT/US2021/061194.
The American Heritage Dictionary of the English Language 3rd Ed., Houghton Mifflin Company, 1996.
The American Heritage Dictionary of The English Language Fourth Edition, Houghton Mifflin Company, 4 pages, 2000.
The New Oxford American Dictionary, Oxford University Press, 2001.
Transcript of Hearing on Plaintiff's Motion to Dismiss on Jan. 15, 2013 in Case No. 0:12-CV-01200 SRN-JSM in Dist. Court of MN.
USPTO Final Office Action, in U.S. Appl. No. 11/096,990, dated Dec. 6, 2007, 10 pages.
Wabtec's Answer and Counterclaims filed Jul. 6, 2012 in Case No. 0:12-CV-01200 SRN-JSM in Dist. Court of MN.
Wabtec's Answer and Counterclaims to Cutsforth's Amended Complaint filed Jul. 27, 2012 in Case No. 0:12-CV-01200 SRN-JSM in Dist. Court of MN.
Wabtec's Answer and Counterclaims to Cutsforth's Second Amended Complaint filed Oct. 9, 2012 in Case No. D:12-CV-01200 SRN-JSM in Dist. Court of MN.
Webster's Third New International Dictionary of the English Language Unabridged, 6 pages, 1961.
Webster's Third New International Dictionary of the English Language Unabridged, 3 pages, 1993.
Invitation to Pay Additional Fees for International Application PCT/US2021/057701 dated Feb. 16, 2022.
General Electric Company, "Collector and Carbon Brush Rigging Installation," Operation and Maintenance, (Revised May 2009).
Gere et al., "Mechanics of Materials," Second Edition, pp. 1-26, 1984.
Hall et al., "Carbon Brush Performance on Slip Rings," Proc. Conf. Rec. Annu. Pulp Paper Ind. Tech. Conf., pp. 1-6, 2010.
Koenitzer, "Brushholders and the Performance of Carbon Brushes," Electrical Apparatus Service Association, Inc., Tech Note No. 22, 2003.
Joint Claim Construction Statement filed May 3, 2013 in Case No. 0:12-CV-01200 SRN-JSM in Dist. Court of MN.
Lemm's Answer and Counterclaims to Cutsforth's Second Amended Complaint filed Oct. 9, 2012 in Case No. 0:12-CV-01200 SRN-JSM in Dist. Court of MN.
Memorandum Opinion and Order filed Jun. 6, 2013 in Case No. 0:12-CV-01200 SRN-JSM in Dist. Court of MN.
Motivepower's Answer and Counterclaims to Cutsforth's Second Amended Complaint filed Oct. 9, 2012 in Case No. 0:12-CV-01200 SRN-JSM in Dist. Court of MN.
Ohmstedt et al., "Maintaining Carbon-Brush Collectors," Power, Jun. 1976.
Oxford Dictionary of Mechanical Engineering, 4 pages, 2013.
Parslow, "Improved Safety of Carbon-Brush Collector Maintenance on Turbine-Generators Retrofitted With On- Line, Removable Plug-In Brush Holders," Energy-Tech.com pp. 1-5, Jun. 2010.
Patent Owner Cutsforth, Inc.'s Motion to Amend U.S. Pat. No. 7,141,906 Under 35 U.S.C. Section 316 and 37 CFR Section 42.121 dated Feb. 6, 2014, in Case IPR2013-00268 for U.S. Pat. No. 7,141,906.
Patent Owner Cutsforth, Inc.'s Motion to Amend U.S. Pat. No. 7,417,354 Under 35 U.S.C. Section 316 and 37 CFR Section 42.121 dated Feb. 6, 2014, in Case IPR2013-00270 for U.S. Pat. No. 7,417,354.
Patent Owner Cutsforth, Inc.'s Motion to Amend U.S. Pat. No. 8,179,014 Under 35 U.S.C. Section 316 and 37 CFR Section 42.121 dated Feb. 6, 2014, in Case IPR2013-00272 for U.S. Pat. No. 8,179,014.
Patent Owner Cutsforth, Inc.'s Preliminary Response filed Aug. 6, 2013 in Case IPR2013-00267 for U.S. Pat. No. 7,122,935.
Patent Owner Cutsforth, Inc.'s Preliminary Response filed Aug. 6, 2013 in Case IPR2013-00268 for U.S. Pat. No. 7,141,906.
Patent Owner Cutsforth, Inc.'s Preliminary Response filed Aug. 6, 2013 in Case IPR2013-00270 for U.S. Pat. No. 7,417,354.
Patent Owner Cutsforth, Inc.'s Preliminary Response filed Aug. 8, 2013 in Case IPR2013-00272 for U.S. Pat. No. 3,179,014.
Patent Owner Cutsforth, Inc.'s Preliminary Response filed Aug. 8, 2013 in Case IPR2013-00274 for U.S. Pat. No. 7,990,018.
Patent Owner Cutsforth, Inc.'s Response dated Feb. 6, 2014 in Case IPR2013-00267 for U.S. Pat. No. 7,122,935.
Patent Owner Cutsforth, Inc.'s Response dated Feb. 6, 2014 in Case IPR2013-00270 for U.S. Pat. No. 7,417,354.
Patent Owner Cutsforth, Inc.'s Response dated Feb. 6, 2014 in Case IPR2013-00272 for U.S. Pat. No. 8,179,014.
Patent Owner Cutsforth, Inc.'s Response dated Feb. 6, 2014 in Case IPR2013-00274 for U.S. Pat. No. 7,990,018.
Patent Owner Cutsforth, Inc.'s Response filed Feb. 6, 2014 in Case IPR2013-00268 for U.S. Pat. No. 7,141,906.
Petition for Inter Partes Review of U.S. Pat. No. 7,122,935 filed with the United States Patent and Trademark Office on May 6, 2013.
Petition for Inter Partes Review of U.S. Pat. No. 7,141,906 filed with the United States Patent and Trademark Office on May 6, 2013.
Petition for Inter Partes Review of U.S. Pat. No. 7,417,354 filed with the United States Patent and Trademark Office on May 6, 2013.
Petition for Inter Partes Review of U.S. Pat. No. 7,990,018 filed with the United States Patent and Trademark Office on May 8, 2013.
Petition for Inter Partes Review of U.S. Pat. No. 8,179,014 filed with the United States Patent and Trademark Office on May 8, 2013.
Petitioner's Reply to Patent Owner's Response dated May 6, 2014 for Case IPR2013-00267 for U.S. Pat. No. 7,122,935.
Petitioner's Reply to Patent Owner's Response dated May 6, 2014 for Case IPR2013-00268 for U.S. Pat. No. 7,141,906.
Petitioner's Reply to Patent Owner's Response dated May 6, 2014 for Case IPR2013-00270 for U.S. Pat. No. 7,417,354.
Petitioner's Reply to Patent Owner's Response dated May 6, 2014 for Case IPR2013-00272 for U.S. Pat. No. 8,179,014.
Petitioner's Reply to Patent Owner's Response dated May 6, 2014 for Case IPR2013-00274 for U.S. Pat. No. 7,990,018.
Plaintiff Cutsforth, Inc.'s Amended Complaint filed Jul. 13, 2012 in Case No. 0:12-CV-01200 SRN-ISM in Dist. Court Df MN.
Plaintiff Cutsforth, Inc.'s Answer to Amended Counterclaims of Fulmer Company, LLC filed Oct. 26, 2012 in Case No. 0:12-CV-01200 SRN-JSM in Dist. Court of MN.
Plaintiff Cutsforth, Inc.'s Answer to Counterclaims of Fulmer Company, LLC filed Jul. 30, 2012 in Case No. 0:12-CV-01200 SRN-JSM in Dist. Court of MN.
Plaintiff Cutsforth, Inc.'s Answer to Counterclaims of Motivepower, Inc. filed Oct. 26, 2012 in Case No. 0:12-CV-01200 SRN-JSM in Dist. Court of MN.
Plaintiff Cutsforth, Inc.'s Answer to Counterclaims of Wabtec filed Jul. 30, 2012 in Case No. 0:12-CV-01200 SRN-JSM in Dist. Court of MN.
Plaintiff Cutsforth, Inc.'s Answer to Defendants' First Set of Interrogatories filed Sep. 24, 2012 in Case No. 0:12-CV-01200 SRN-JSM in Dist. Court of MN.
Plaintiff Cutsforth, Inc.'s Answer to Wabtec's Amended Counterclaims filed Oct. 26, 2012 in Case No. 0:12-CV-01200 SRN-JSM in Dist. Court of MN.
Plaintiff Cutsforth, Inc.'s Complaint filed May 17, 2012 in Case No. 0:12-CV-01200 SRN-JSM in Dist. Court of MN.
Plaintiff Cutsforth, Inc.'s Final Infringement Contentions filed May 10, 2013 in Case No. 0:12-CV-01200 SRN-ISM in Dist. Court of MN.
Plaintiff Cutsforth, Inc.'s First Supplemental Response to Defendants' First Set of Interrogatories filed Oct. 26, 2012 in Case No. 0:12-CV-01200 SRN-JSM in Dist. Court of MN.

(56) References Cited

OTHER PUBLICATIONS

Plaintiff Cutsforth, Inc.'s Memorandum in Support of Its Motion to Dismiss Inequitable Conduct Pleadings filed Oct. 26, 2012 in Case No. 0:12-CV-01200 SRN-JSM in Dist. Court of MN.
Plaintiff Cutsforth, Inc.'s Reply Memorandum in Support of Its Motion to Dismiss Inequitable Conduct Pleadings (Redacted Version) filed Dec. 3, 2012 in Case No. 0:12-CV-01200 SRN-JSM in Dist. Court of MN.
Plaintiff Cutsforth, Inc.'s Response to Defendants' Preliminary Invalidity Contentions filed Dec. 21, 2012, in Case No. 0:12-CV-01200 SRN-JSM in Dist. Court of MN.
Plaintiff Cutsforth, Inc.'s Second Amended Complaint filed Sep. 25, 2012 in Case No. 0:12-CV-01200 SRN-JSM in Dist. Court of MN.
Claim Chart of U.S. Pat. No. 7,122,935, filed as Exhibit 2014 with Patent Owner Cutsforth, Inc.'s Response dated Feb. 6, 2014 in Case IPR2013-00267 for U.S. Pat. No. 7,122,935.
Claim Chart of U.S. Pat. No. 7,417,354, filed as Exhibit 2014 with Patent Owner Cutsforth, Inc.'s Response dated Feb. 6, 2014 in Case IPR2013-00270 for U.S. Pat. No. 7,417,354.
Claim Chart of U.S. Pat. No. 7,990,018, filed as Exhibit 2017 with Patent Owner Cutsforth, Inc.'s Response dated Feb. 6, 2014 in Case IPR2013-00274 for U.S. Pat. No. 7,990,018.
Claim Chart of U.S. Pat. No. 8,179,014, filed as Exhibit 2014 with Patent Owner Cutsforth, Inc.'s Response dated Feb. 6, 2014 in Case IPR2013-00272 for U.S. Pat. No. 8,179,014.
Maughan, "Recent Publications," retrieved from internet: http://home.earthlink.net/.about.theclyde/Publications.html retrieved on Feb. 1, 2014 (Dec. 17, 2013).
Maughan, "Maintaining Carbon-Brush Collectors," Combined Cycle Journal, pp. 98-104, 2010.
Maughan, "Carbon Brush Collector Maintenance on Turbine-Generators," IEEE, pp. 57-62, 2007.
Cutsforth PrelimInfringement Contentions w-Exs A-E Oct. 5, 2012 filed in Case No. 0:12-cv-01200 in Dist. Court of MN.
Cutsforth Resp to Defs Invalidity Contentions Dec. 21, 2012 filed in Case No. 0:12-cv-01200 in Dist. Court of MN.
Decision Institution of Inter Partes Review dated Nov. 1, 2013 for Case IPR2013-00267 for U.S. Pat. No. 7,122,935.
Decision Institution of Inter Partes Review dated Nov. 1, 2013 for Case IPR2013-00268 for U.S. Pat. No. 7,141,906.
Decision Institution of Inter Partes Review entered Nov. 1, 2013 for Case IPR2013-00270 for U.S. Pat. No. 7,417,354.
Decision Institution of Inter Partes Review entered Nov. 1, 2013 for Case IPR2013-00272 for U.S. Pat. No. 8,179,014.
Decision Institution of Inter Partes Review entered Nov. 1, 2013 for Case IPR2013-00274 for U.S. Pat. No. 7,990,018.
Decision on Motion to Amend Claims entered Feb. 18, 2014 in Case IPR2013-00268 for U.S. Pat. No. 7,141,906.
Decision on Motion to Amend Claims entered Feb. 18, 2014 in Case IPR2013-00270 for U.S. Pat. No. 7,417,354.
Decision on Motion to Amend Claims entered Feb. 18, 2014 in Case IPR2013-00272 for U.S. Pat. No. 8,179,014.
Declaration of Dustin Cutsforth, dated Feb. 6, 2014, in Case IPR2013-00267 for U.S. Pat. No. 7,122,935.
Declaration of Dustin Cutsforth, dated Feb. 6, 2014, in Case IPR2013-00270 for U.S. Pat. No. 7,417,354.
Declaration of Dustin Cutsforth, dated Feb. 6, 2014, in Case IPR2013-00272 for U.S. Pat. No. 8,179,014. xx.
Declaration of Dustin Cutsforth, dated Feb. 6, 2014, in Case IPR2013-00274 for U.S. Pat. No. 7,990,018.
Declaration of Jason A. Engel in Support of Defendants' Opposition to Motion to Dismiss filed Nov. 16, 2012 in Case No. 0:12-CV-01200 SRN-JSM in Dist. Court of MN.
Declaration of Joseph A. Herriges in Support of Plaintiff Cutsforth, Inc.'s Memorandum of Law in Support of Its Motion to Dismiss Inequitable Conduct Pleadings filed Oct. 26, 2012 in Case No. 0:12-CV-01200 SRN-JSM in Dist. Court of MN.
Declaration of Thomas A. Keim, Sc.D., dated Feb. 6, 2014, in Case IPR2013-00267 for U.S. Pat. No. 7,122,935.
Declaration of Thomas A. Keim, Sc.D., dated Feb. 6, 2014, in Case IPR2013-00268 for U.S. Pat. No. 7,141,906.
Declaration of Thomas A. Keim, Sc.D., dated Feb. 6, 2014, in Case IPR2013-00270 for U.S. Pat. No. 7,417,354.
Declaration of Thomas A. Keim, Sc.D., dated Feb. 6, 2014, in Case IPR2013-00272 for U.S. Pat. No. 8,179,014.
Declaration of Thomas A. Keim, Sc.D., dated Feb. 6, 2014, in Case IPR2013-00274 for U.S. Pat. No. 7,990,018.
Defendants' Opposition to Motion to Dismiss filed Nov. 16, 2012 in Case No. 0:12-CV-01200 SRN-JSM in Dist. court of MN.
Defendant's Preliminary Non-Infringement, Unenforceability and Invalidity Contentions filed Nov. 9, 2012 in Case No. 0:12-CV-01200 SRN-JSM in Dist. Court of MN.
Defendant's Unenforceability and Invalidity Contentions, filed May 10, 2013 in Case No. 0:12-CV-01200-SRN-JSM in Dist. Court of MN.
Defs Exs 1-5 to Non-Infringe Contentions Nov. 9, 2012 filed in Case No. 0-12-cv-01200 in Dist. Court of MN.
Defs Exs A-E to Invalidity Contents Nov. 9, 2012 filed in Case No. 0:12-cv-01200 in Dist. Court of MN.
Defs Non-Infringe-Invalidity Contentions Nov. 9, 2012 filed in Case No. 0:12-cv-1200 in Dist. Court of MN.
Documents depicting brush holder designs, sent by applicant on Apr. 5, 2002 (3 pgs).
Documents depicting various processes of electropolishing, sent by applicant on Dec. 17, 2002 (3 pgs).
Final Written Decision entered Oct. 30, 2014 in Case IPR2013-00267 for U.S. Pat. No. 7,122,935.
Final Written Decision entered Oct. 30, 2014 in Case IPR2013-00268 for U.S. Pat. No. 7,141,906.
Final Written Decision entered Oct. 30, 2014 in Case IPR2013-00270 for U.S. Pat. No. 7,417,354.
Final Written Decision entered Oct. 30, 2014 in Case IPR2013-00272 for U.S. Pat. No. 8,179,014.
Final Written Decision entered Oct. 30, 2014 in Case IPR2013-00274 for U.S. Pat. No. 7,990,018.
Fulmer's Answer and Counterclaims filed Jul. 6, 2012 in Case No. 0:12-CV-01200 SRN-JSM in Dist. Court of MN.
Fulmer's Answer and Counterclaims to Cutsforth's Amended Complaint filed Jul. 27, 2012 in Case No. 0:12-CV-01200 SRN-JSM in Dist. Court of MN.
GE Industrial & Power Systems, "Collectors, Brush Rigging, Cartridge Brush Holders and Brushes," pp. 1-30, revised Oct. 1992.
GE Power Systems, "Brush Rigging and Collector Rings," pp. 1-8, Revised Jul. 1994.
Roark et al., "Formulas for Stress and Strain," Fifth Edition, pp. 89-205, 1975.
Supplemental Declaration of Thomas A. Keim, Sc.D, dated Feb. 28, 2014 in Case IPR2013-00267 for U.S. Pat. No. 7,122,935.
Supplemental Declaration of Thomas A. Keim, Sc.D, dated Feb. 28, 2014 in Case IPR2013-00268 for U.S. Pat. No. 7,141,906.
Supplemental Declaration of Thomas A. Keim, Sc.D, dated Feb. 28, 2014 in Case IPR2013-00270 for U.S. Pat. No. 7,417,354.
Supplemental Declaration of Thomas A. Keim, Sc.D, dated Feb. 28, 2014 in Case IPR2013-00272 for U.S. Pat. No. 8,179,014.
Supplemental Declaration of Thomas A. Keim, Sc.D, dated Feb. 28, 2014 in Case IPR2013-00274 for U.S. Pat. No. 7,990,018.

* cited by examiner

BRUSH HOLDER ASSEMBLY

CROSS-REFERENCE TO RELATED APPLICATIONS

This application claims the benefit of priority under 35 U.S.C. § 119 to U.S.

Provisional Application Ser. No. 63/243,314, filed Sep. 13, 2021 and to U.S. Provisional Application Ser. No. 63/119,803, filed Dec. 1, 2020, the disclosures of which are incorporated herein by reference.

TECHNICAL FIELD

The disclosure generally relates to brushes and brush holder assemblies that may be used in electrical devices and/or slip ring assemblies. More specifically, the disclosure relates to a brush holder assembly configured to hold a brush in contact with a moving conductive surface.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current. Electrically conductive leads or shunts extend from the brush to provide an electrical pathway to and/or from the brush from another conductive member.

In some designs, a brush box type brush holder, or other type of brush holder, may be used to support a brush in contact with a moving contact surface of an electrical device during operation. The brush and brush box may be designed such that the brush can slide within the brush box to provide for continuing contact between the brush and the moving contact surface contacted by the brush. Brushes, brush holders, related components and methods for manufacturing brushes, brush holders and related components are discussed herein.

SUMMARY

A first example is a brush assembly including a carbon brush, an electrically conductive terminal and an electrically conductive lead assembly attached to both the carbon brush and the electrically conductive terminal. The electrically conductive lead assembly includes a spliced union located between the electrically conductive terminal and the carbon brush and spaced away from both the electrically conductive terminal and the carbon brush.

In addition or alternatively, the electrically conductive lead assembly includes a first lead wire coupled to a second lead wire at the spliced union.

In addition or alternatively, the first lead wire is secured to the electrically conductive terminal and extends from the electrically conductive terminal to the spliced union, and the second lead wire is secured to the carbon brush and extends from the carbon brush to the spliced union.

In addition or alternatively, the spliced union is formed by welding a first end region of the first lead wire to a first end region of the second lead wire.

In addition or alternatively, the first lead wire includes a second end region secured to the carbon brush and the second lead wire includes a second end region secured to the carbon brush.

In addition or alternatively, the spliced union is formed by welding the first end region of the first lead wire to the first end region of the second lead wire.

In addition or alternatively, the first lead wire includes a medial region located between the first end region of the first lead wire and the second end region of the first lead wire.

In addition or alternatively, the electrically conductive terminal is secured to the medial region of the first lead wire.

In addition or alternatively, the second end region of the first lead wire is embedded in a top surface of the carbon brush at a first location and the second end region of the second lead wire is embedded in the top surface of the carbon brush at a second location, wherein the first location is spaced away from the second location.

In addition or alternatively, a portion of the medial region of the first lead wire is welded to the first end region of the first lead wire and/or the first end region of the second lead wire at the spliced union.

In addition or alternatively, the spliced union includes a wear mark, wherein the wear mark is utilized as a reference point to determine diminution of wear of the carbon brush.

In addition or alternatively, the spliced union is formed by welding a first end region and a second end region of the first lead wire to a first end region of the second lead wire.

In addition or alternatively, the first lead wire includes a medial region located between the first end region and the second end region of the first lead wire, wherein the medial region of the first lead wire is secured to the electrically conductive terminal. In addition or alternatively, the medial region of the first lead wire is ultrasonically welded to the electrically conductive terminal.

In addition or alternatively, the electrically conductive lead assembly includes a third lead wire coupled to the first and second lead wires at the spliced union.

In addition or alternatively, the spliced union is formed by welding a first end region and a second end region of the first lead wire to a first end region of the second lead wire and a first end region of the third lead wire.

In addition or alternatively, a second end region of the second lead wire is embedded in a top surface of the brush at a first location and a second end region of the third lead wire is embedded in the top surface of the brush at a second location, and wherein the first location is spaced away from the second location.

In addition or alternatively, the electrically conductive terminal includes an inner core layer positioned between a first conductive metal layer and a second conductive metal layer.

In addition or alternatively, the inner core layer includes steel.

In addition or alternatively, the first conductive metal layer, the second conductive metal layer or both the first conductive metal layer and the second conductive metal layer includes copper.

Another example is a method of manufacturing a brush assembly. the method includes welding a first end region of a first lead wire to a first end region of a second lead wire. The first lead wire was previously secured to an electrically conductive terminal and the second lead wire was previously secured to a carbon brush prior to the welding step. The welding forms a spliced union between the first lead wire and the second lead wire. The spliced union is located at a location between and spaced away from the carbon brush and the electrically conductive terminal.

In addition or alternatively, prior to securing the first lead wire to the electrically conductive terminal a second end region of the first lead wire is embedded in a top surface of the brush at a first location and a second end region of the second lead wire is embedded in the top surface of the brush at a second location.

In addition or alternatively, the first lead wire includes a medial region located between the first end region of the first lead wire and the second end region of the first lead wire, and the electrically conductive terminal is secured along the medial region of the first lead wire.

In addition or alternatively, the first lead wire is longer than the second lead wire and the electrically conductive terminal is secured along the medial region of the first lead wire at a location closer to the first end region of the first lead wire than to the second end region of the first lead wire.

In addition or alternatively, the welding step further includes welding a portion of the medial region of the first lead wire to the first end region of the first lead wire and/or the first end region of the second lead wire at the spliced union.

In addition or alternatively, prior to the welding step, the first end region of the first lead wire the first end region of the second lead wire and the medial region of the first lead wire are positioned in a welding fixture with the first end region of the first lead wire overlapping with the first end region of the second lead wire.

In addition or alternatively, the method includes forming a wear mark on a surface of the spliced union.

In addition or alternatively, the welding step further includes welding a second end region of the first lead wire to a first end region of a third lead wire at the spliced union.

In addition or alternatively, the method includes prior to the welding step, positioning the first and second end regions of the first lead wire in a welding fixture, positioning the first end region of the second lead wire in the welding fixture, and positioning the first end region of the third lead wire in the welding fixture. The first end region of the first lead wire overlaps with the first end region of the second lead wire and the second end region of the first lead wire overlaps with the first end region of the third lead wire.

In addition or alternatively, the method includes welding a first end region of a third lead wire to the first end region of the first lead wire and the first end region of the second lead wire at the spliced union. The third lead wire was previously secured to the carbon brush prior to the welding step.

Another example is a brush holder assembly for positioning a conductive carbon brush in contact with a conductive surface of an electrical device. The assembly includes a brush holder including a brush box and a beam secured thereto, a carbon brush slidably disposed in the brush box and an electrically conductive terminal releasably attached to the beam of the brush holder. The assembly further includes a first lead wire secured to the electrically conductive terminal and a second lead wire secured to the carbon brush and extending therefrom. A first end region of the first lead wire is secured to a first end region of the second lead wire at a spliced union. The spliced union is positioned between and spaced away from the carbon brush and the electrically conductive terminal.

In addition or alternatively, the first end region of the first lead wire is ultrasonically welded to the first end region of the second lead wire at the spliced union.

In addition or alternatively, the first lead wire includes a medial region located between the first end region of the first lead wire and a second end region of the first lead wire, wherein the electrically conductive terminal is secured along the medial region of the first lead wire.

In addition or alternatively, the first lead wire is longer than the second lead wire and the electrically conductive terminal is secured along the medial region of the first lead wire at a location closer to the first end region of the first lead wire than to the second end region of the first lead wire.

In addition or alternatively, the second end region of the first lead wire is embedded in a top surface of the brush at a first location and a second end region of the second lead wire is embedded in the top surface of the brush at a second location, wherein the first location is spaced away from the second location.

In addition or alternatively, the spliced union is formed by welding the first end region of the first lead wire, the second end region of the first lead wire and a portion of the medial region of the first lead wire together.

In addition or alternatively, the spliced union is formed by welding the first end region and a second end region of the first lead wire to the first end region of the second lead wire.

In addition or alternatively, the electrically conductive terminal includes an inner core layer positioned between a first conductive metal layer and a second conductive metal layer.

In addition or alternatively, the spliced union includes a wear mark, wherein the wear mark is utilized as a reference point to determine diminution of wear of the carbon brush.

Another example is a brush assembly including a carbon brush having an upper surface and a lower surface, an electrically conductive terminal, and an electrically conductive lead assembly attached to both the carbon brush and the electrically conductive terminal. The electrically conductive terminal includes an inner core layer positioned between a first conductive metal layer and a second conductive metal layer.

In addition or alternatively, the electrically conductive lead assembly is directly welded to the first conductive metal layer of the electrically conductive terminal.

In addition or alternatively, the inner core layer includes steel.

In addition or alternatively, the first conductive metal layer, the second conductive metal layer or both the first conductive metal layer and the second conductive metal layer includes copper.

In addition or alternatively, the electrically conductive lead assembly includes a spliced union located between the electrically conductive terminal and the carbon brush and spaced away from both the electrically conductive terminal and the carbon brush.

In addition or alternatively, the electrically conductive lead assembly includes a first lead wire coupled to a second lead wire at the spliced union.

In addition or alternatively, the first lead wire is secured to the electrically conductive terminal and extends from the electrically conductive terminal to the spliced union, and the second lead wire is secured to the carbon brush and extends from the carbon brush to the spliced union.

In addition or alternatively, the spliced union is formed by welding a first end region of the first lead wire to a first end region of the second lead wire.

In addition or alternatively, the first lead wire includes a medial region located between the first end region of the first lead wire and a second end region of the first lead wire, wherein the second end region of the first lead wire is secured to the carbon brush and the medial region of the first lead wire is secured to the electrically conductive terminal.

In addition or alternatively, a portion of the medial region of the first lead wire is welded to the first end region of the first lead wire and/or the first end region of the second lead wire at the spliced union.

In addition or alternatively, the spliced union is formed by welding a first end region and a second end region of the first lead wire to a first end region of the second lead wire.

The above summary of some embodiments, aspects, and/or examples is not intended to describe each embodiment or every implementation of the present disclosure. The figures and the detailed description which follows more particularly exemplify these embodiments.

BRIEF DESCRIPTION OF THE DRAWINGS

The aspects of the disclosure may be more completely understood in consideration of the following detailed description of various embodiments in connection with the accompanying drawings, in which.

Figure 1:
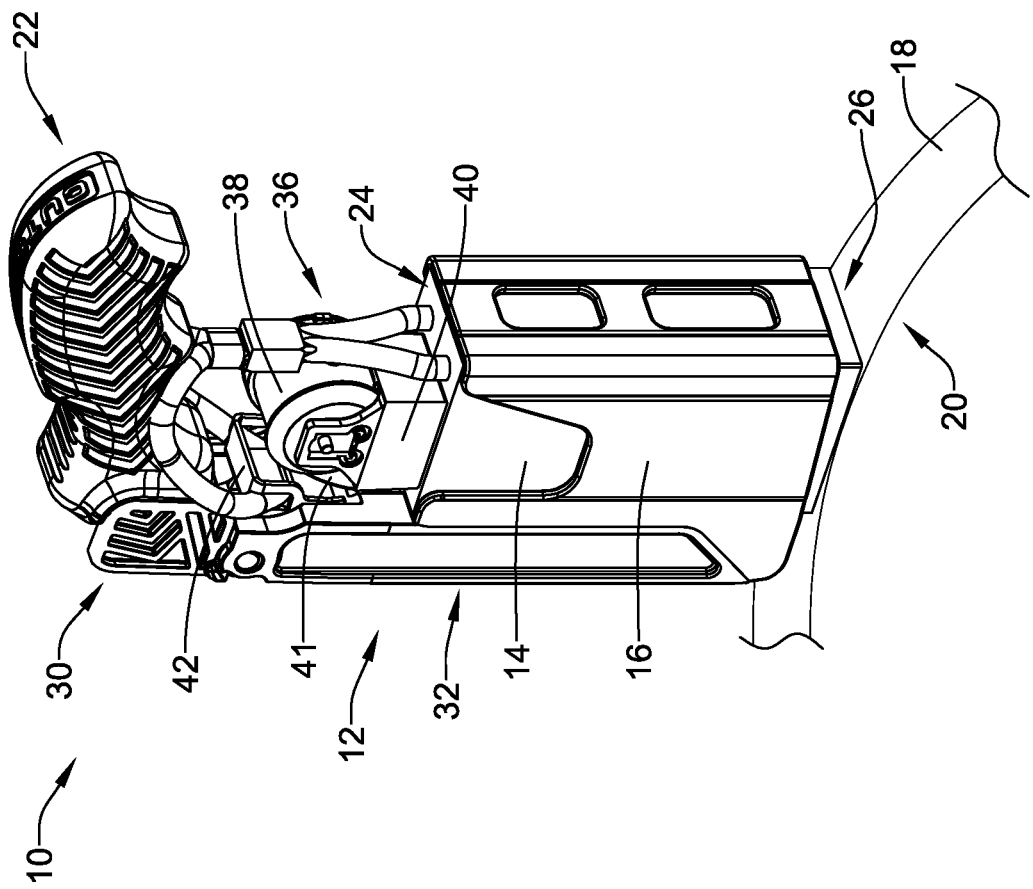
FIG. 1 is an illustrative view of an exemplary brush holder assembly positioned adjacent a rotating component of an electrical machine.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 illustrates an exemplary system 10 that may include a brush holder assembly 12. In some respects, the brush holder assembly 12 may possess similarities of a brush holder assembly as described in U.S. Pat. No. 7,034,430, entitled "BRUSH HOLDER APPARATUS, BRUSH ASSEMBLY, AND METHOD", which is herein incorporated by reference in its entirety. However, the illustrative system 10 includes features as described herein.

FIG. 1 further illustrates that the brush holder assembly 12 may include a brush holder 16 within which a carbon brush 14 is positioned. FIG. 1 illustrates that, in some examples, one or more sides of the brush 14 may be surrounded by the brush holder 16 (e.g., a brush box), whereby the brush holder 16 may include a plurality of guiding surfaces for guiding linear or longitudinal movement of the brush 14 toward the conductive surface 18 of the rotating component 20. In other words, the brush 14 may translate linearly within an aperture defined by the plurality of guiding surfaces of the brush holder 16 as the brush 14 wears. In some embodiments it is contemplated that the brush holder 16 may not take on the form of a box, but may include one or a plurality of guiding surfaces, such as channels, posts or columns, abutting and/or encompassing one or more sides of the brush 14 and/or extending into or through the brush 14, or a portion thereof, for guiding linear or longitudinal movement of the brush 14.

FIG. 1 further illustrates that, in some embodiments, a handle 22 may be coupled to or otherwise provided with the holder assembly 12 (including the brush holder 16) to facilitate engagement and disengagement of the brush 14 from the conductive surface 18.

FIG. 1 further illustrates that the brush 14 may include a first or upper end surface 24 and a second or lower end surface 26 and a length extending therebetween. The second end surface 26 may be in electrical contact with the conductive surface 18 of a moving (e.g., rotating, sliding, etc.) component 20 of an electrical machine (e.g., a collector ring, a slip ring, or a commutator) and conduct electrical current therefrom. The brush holder assembly 12 may be configured to place the brush 14 in contact with the conductive surface 18, such as the surface of the rotating component 20 of the electrical machine. The brush 14 may extend from the lower edge of the brush holder 16 such that the second end surface 26 of the brush 14 engages the conductive surface 18.

As shown in FIG. 1, the brush assembly 12 may include an upper beam 30 and a lower beam 32 hingedly or pivotably coupled to one another. When the upper beam 30 and the lower beam 32 are aligned with one another (e.g., the longitudinal axis of the upper beam 30 is parallel with the longitudinal axis of the lower beam 32), the brush holder 16 may be considered to be in an engaged, or locked, position such that the brush 14 may be contiguous with or in direct electrical contact with the conductive surface 18.

FIG. 1 further illustrates that the brush holder assembly 12 may include a wear state monitor 38 and a spacer 40. Additional aspects of the wear state monitor 38 and associated structure and functionality are described in U.S. Patent Publication Nos. 2020/0112133 and 2020/0112223, the disclosures of which are incorporated by reference herein. The spacer 40 may be attached to the first end surface 24 of the brush 14. Additionally, FIG. 1 illustrates that the wear state monitor 38 may be coupled to a spring 41. In some examples, a portion of the spring 41 may be coiled around a portion of the wear state monitor 38, with an elongate portion of the spring 41 extending from the coiled portion. Thus, the wear state monitor 38 may be positioned within the coiled portion of the spring 41.

As described above, in some examples the wear state monitor 38 may be mounted adjacent a surface of the spring 41 or otherwise within the spring 41, such as within the coiled portion of the spring 41. The spring 41 may include a constant force spring, which provides tension to the brush 14, the wear state monitor 38 or both the brush 14 and the wear state monitor 38 to bias the brush 14 toward and in contact with the conductive surface 18 of the rotating component 20. In other words, the spring 41 may include a coiled portion designed to provide a force to engage the brush 14 with a rotating component 20 of an electrical machine, such as a slip ring, a commutator, and the like.

FIG. 1 further illustrates that the brush holder assembly 12 may include a conductive wire assembly 36 extending from the first end surface 24 of the brush 14 to one or more different components of the brush holder assembly 12 to conduct electricity from the brush 14 to a terminal 42. For example, the conductive wire assembly 36 may extend from the first end surface 24 of the brush 14 and attach to the terminal 42, which, in turn, may be attached to a mounting block (not shown in the Figures), a portion of the lower beam 32, a portion of the upper beam 30 or portions of both the lower beam 32 and the upper beam 30. While not shown for simplicity, in some examples the lower beam 32 may be releasably engage another structure, such as a mounting block (not shown in the Figures).

As discussed above, the brush holder assembly 12 may be configured to maintain the conductive surface 26 of the brush 14 against the conductive surface 18 of the rotating component 20. As an electrical current is generated by an electrical machine (e.g., a collector ring, a slip ring, or a commutator), the moving (e.g., rotating, sliding, etc.) component 20 may pass the electrical current to the brush 14, whereby the electrical current may continue through the conductive lead assembly 36 to the terminal 42. Further, because the terminal 42 may be engaged with a mounting block (not shown in the Figures), it may pass the electrical current to/from the mounting block.

Figure 2:
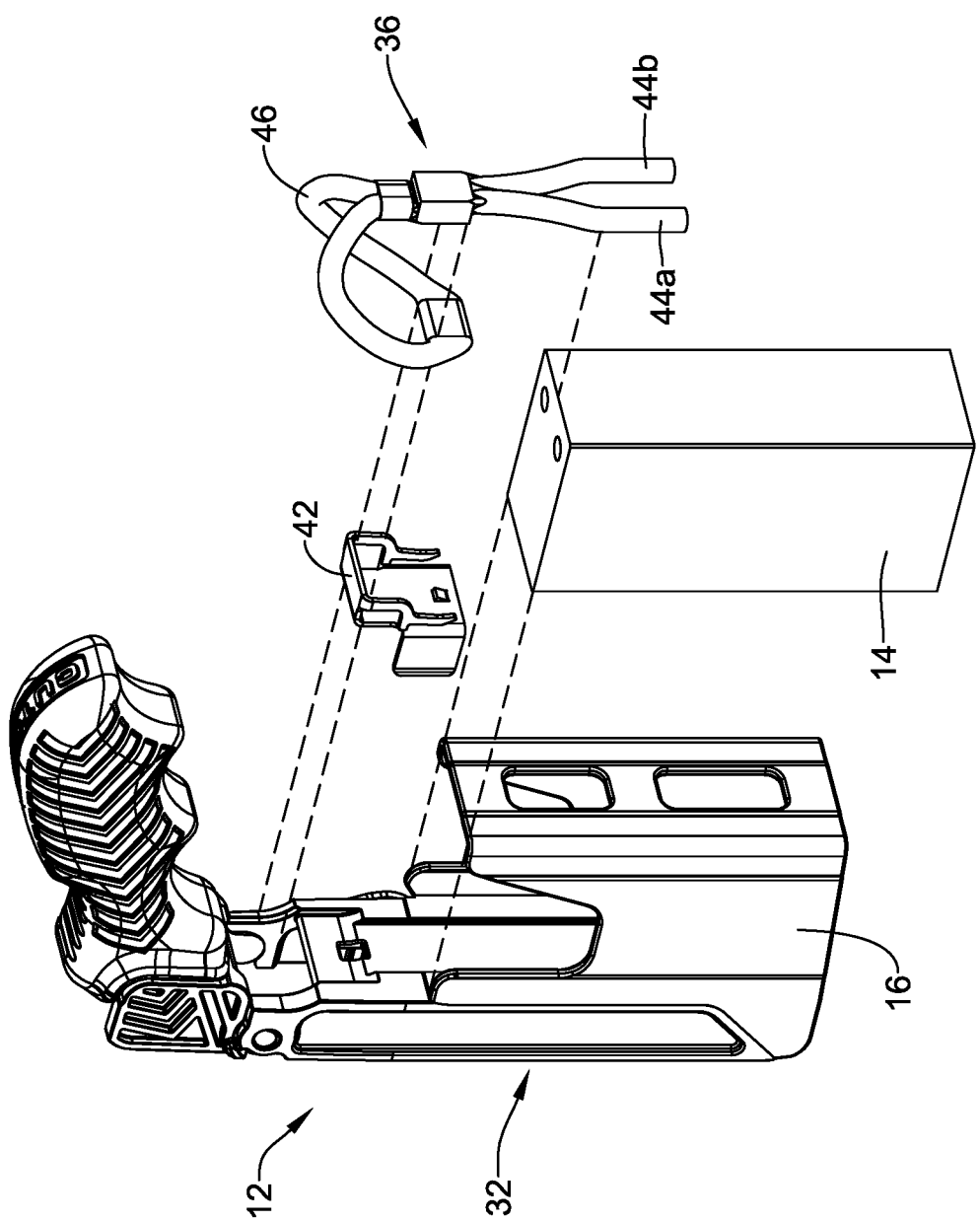
FIG. 2 is an exploded view of components of the exemplary brush holder assembly of FIG. 1.

FIG. 2 is an exploded view of various components of the brush holder assembly 12 shown in FIG. 1. Specifically, FIG. 2 illustrates the conductive lead assembly 36, the terminal 42 and the brush 14, all which are spaced away (for ease of visibility) from the remainder of the brush holder assembly 12. It can be appreciated that the dashed lines of FIG. 2 illustrate the alignment of each of the components (e.g., the terminal 42, the conductive lead assembly 36 and the brush 14) with the lower beam 32 of the brush holder assembly 12. It is further noted that, for simplicity, the wear state monitor 38, the spacer 40 and the spring 41 have been omitted from FIG. 2.

FIG. 2 further illustrates that the conductive electrical lead assembly 36 may include a first electrical lead wire 46 which, as will be described in greater detail below, may be spliced with a second electrical lead wire 44a and/or a third electrical lead wire 44b to form a spliced union (e.g., spliced junction, welded junction) along the conductive lead assembly 36. Referring back to FIG. 1, it can be appreciated that, when fully assembled, the second electrical lead wire 44a and the third electrical lead wire 44b may define that portion of the conductive electrical assembly 36 which is attached to the brush 14 (e.g., as will be described in greater detail below, a portion of the second electrical lead wire 44a and the third electrical lead wire 44b may be embedded within the brush 14). It can be further appreciated from FIG. 1 (and described in greater detail below) that, when fully assembled, the first electrical lead wire 46 may be attached (e.g., welded) to the terminal 42, which may be releasably attached to the lower beam 32.

Figure 3:
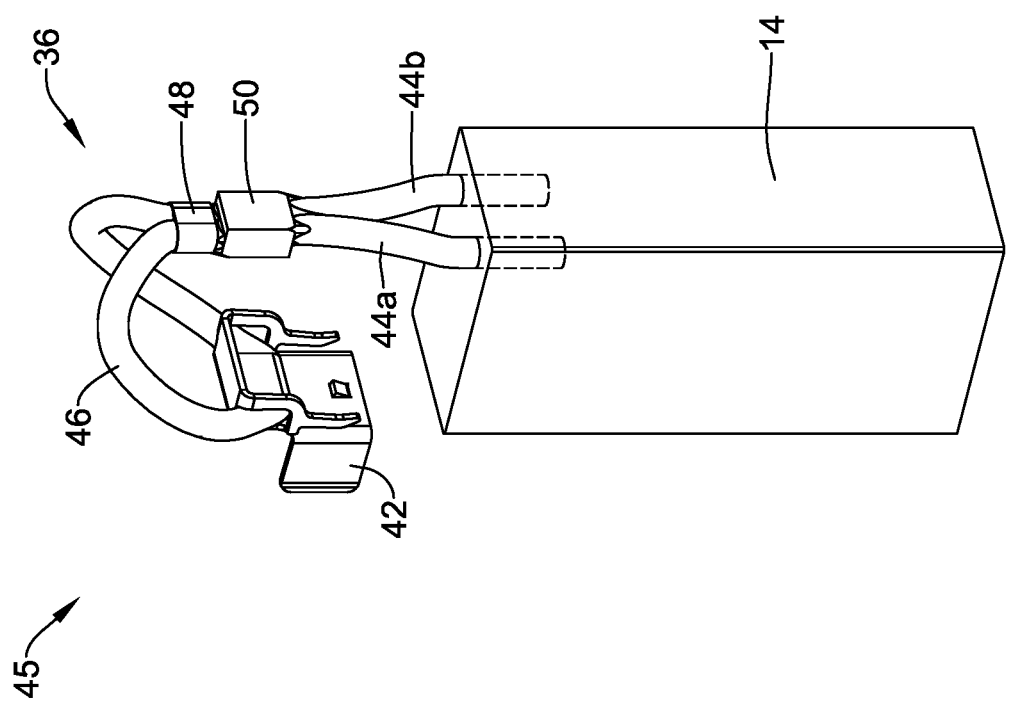
FIG. 3 illustrates the brush assembly of the exemplary brush holder assembly of FIG. 1.

FIG. 3 illustrates a brush assembly 45 of the brush holder assembly 12 (shown in FIG. 2), which includes the conductive electrical lead assembly 36 attached to both the terminal 42 and the brush 14. The conductive electrical lead assembly 36 extends between the terminal 42 and the brush 14. As will be discussed below, it may be beneficial to attach the first electrical lead wire 46 of the conductive electrical lead assembly 36 to the terminal 42 in an isolated manufacturing step, attach the second electrical lead wire 44*a* and/or the third electrical lead wire 44*b* to the brush 14 in another isolated manufacturing step, and thereafter splice (e.g., join, attach, connect) the second electrical lead wire 44*a* and/or the third electrical lead wire 44*b* together with the first electrical lead wire 46 to construct the overall brush assembly 45 shown in FIG. 3. Further, the combined structure of the terminal 42, the conductive electrical lead assembly 36 and the brush 14 shown in FIG. 3 may then be coupled with the remaining components of the brush holder assembly 12 to achieve the system 10 shown in FIG. 1. As the brush 14 wears during use, the worn brush assembly 45 (including the terminal 42, the conductive electrical lead assembly 36 and the worn brush 14) can be removed from the brush holder of the brush holder assembly 12 and replaced with another new brush assembly 45 including a new, unused brush 14 and associated terminal 42 and conductive electrical lead assembly 36.

Figure 4:
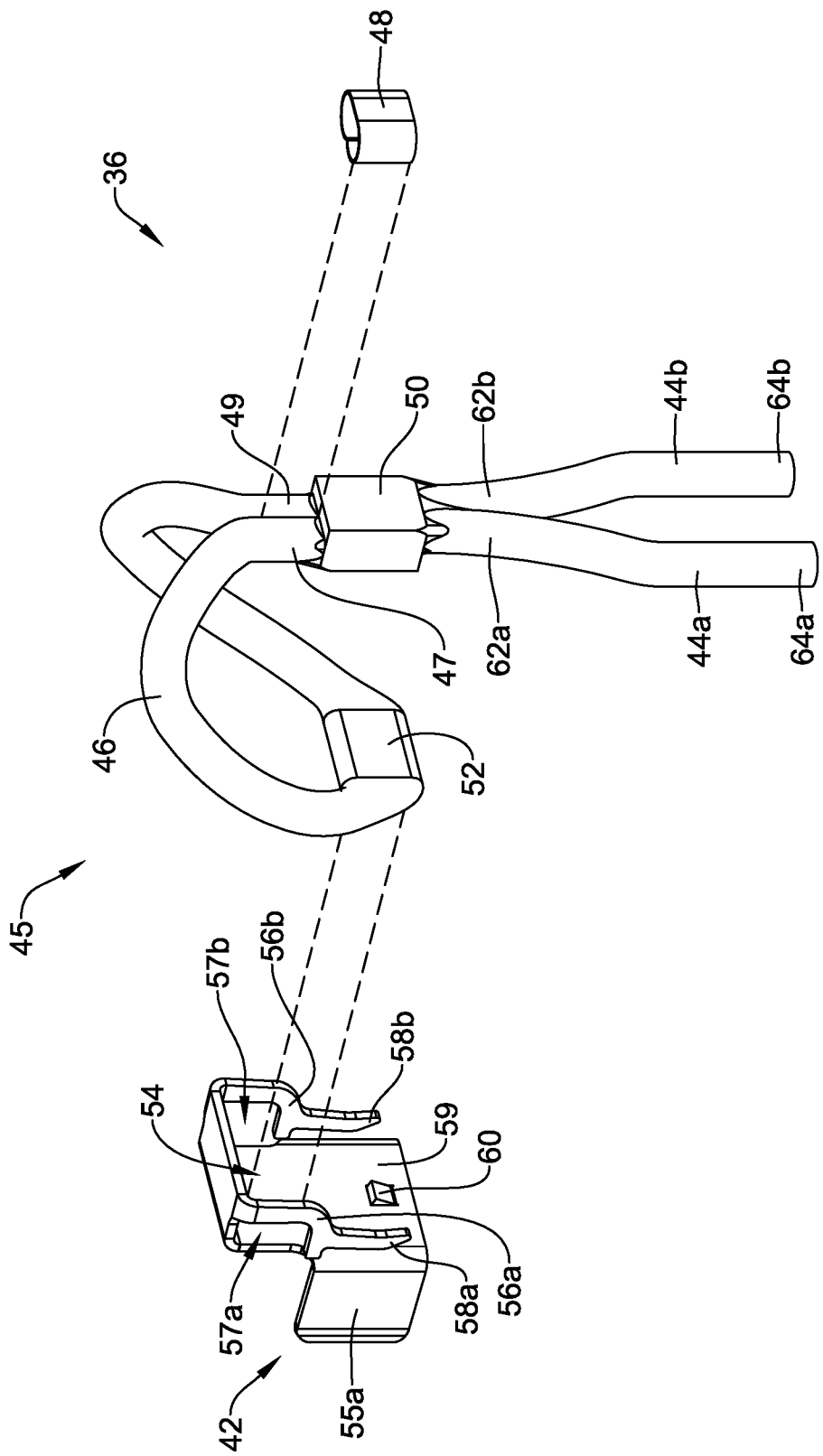
FIG. 4 is an exploded view of the brush assembly of the exemplary brush holder assembly shown in FIG. 3.

FIG. 4 is an exploded view of several components of the brush assembly 45 shown in FIG. 3. For simplicity, the brush 14 has been omitted from FIG. 4. Accordingly, FIG. 4 illustrates the terminal 42 spaced from the conductive electrical lead assembly 36. Additionally, FIG. 4 illustrates that the conductive electrical lead assembly 36 may further include a band 48 (shown spaced away from the conductive electrical lead assembly 36). It is noted that while the band 48 is shown attached to the first electrical lead wire 46 above the splice 50, it is contemplated that the band 48 could also be attached to the second electrical lead wire 44*a* and/or the third electrical lead wire 44*b* below the splice 50, without any change in the performance or functionality of the system 10 or any individual component thereof. In some instances, the band 48 may be a clip, strap, or other structure configured to surround the end regions of the first electrical lead wire 46 proximate the splice 50 (or surround the end regions of the second electrical lead wire 44*a* and/or the third electrical lead wire 44*b* in an alternative embodiment).

It can be appreciated from FIG. 4 that the terminal 42 may include one or more features which are designed to engage the lower beam 32 and/or a mounting block (not shown in the Figures) of the brush holder assembly 12. For example, FIG. 4 illustrates that the terminal 42 may include a first side wall 55*a* and a second side wall 55*b* (not visible in FIG. 4, but shown in FIG. 7). Each of the first side wall 55*a* and the second side wall 55*b* may be designed to engage with, interlock with or otherwise removably couple to a portion of the lower beam 32 and/or a mounting block, thereby fixedly attaching the terminal 42 to the lower beam 32 and/or a mounting block to pass electrical current therebetween.

FIG. 4 further illustrates that the terminal 42 may include a first engagement arm 56*a* and a second engagement arm 56*b*. It can be appreciated that, along with the first side wall 55*a* and the second side wall 55*b*, the first engagement arm 56*a* and the second engagement arm 56*b* may be designed to slidably engage a portion of the lower beam 32. For example, each of the first engagement arm 56*a* and the second engagement arm 56*b* may include distal end regions 58*a*/58*b* which may be designed to engage a portion of the lower beam 32. For example, the first engagement arm 56*a* and the second engagement arm 56*b* may be designed to slide (e.g., hook, clip, etc.) onto a portion of the lower beam 32 with the first and second engagement arms 56*a*/56*b* positioned on a first side of a rear wall of the lower beam 32 and the first and second side walls 55*a*/55*b*, along with the lower face 59 on the opposite, second side of the rear wall of the lower beam 32. FIG. 4 illustrates that the terminal 42 may define a gap between the lower face 59 and the distal end regions 58*a*/58*b* of the first engagement arm 56*a* and the second engagement arm 56*b*, within which a portion of the lower beam 32 may slide. In other words, coupling the terminal 42 to the lower beam 32 may include sliding a portion of the rear wall of the lower beam 32 between the lower face 59 and both the distal end regions 58*a*/58*b* of each of the first engagement arm 56*a* and the second engagement arm 56*b*.

FIG. 4 further illustrates that the lower face 59 may include a tab 60 (e.g., projection, protrusion, bump, etc.) which extends or projects away from the surface of the lower face 59. It can be appreciated that the tab 60 may engage with a mating aperture located in a portion of the lower beam 32 (not shown in FIG. 4). The tab 60 may be utilized to properly align and retain the terminal with the lower beam 32 and/or a mounting block (not shown in Figures) when engaging and disengaging the brush holder assembly 12 with an electrical machine. Further, the engagement of the tab 60 with the aperture located in the lower beam 32 may provide an interlocking interface between the terminal 42 and the lower beam 42 which may releasably couple the terminal 42 to the lower beam 32. The engagement of the terminal 42 with the lower beam 32 via the interlock of the tab 60 with the aperture of the lower beam 32 may increase the threshold force required to remove the terminal 42 from the lower 32, and thereby may prevent the unintentional release of the terminal 42 from the lower beam 32 when the system 10 is attached to an electrical machine.

Additionally, FIG. 4 illustrates that the terminal 42 may include an attachment face 54. The attachment face 54 may lie in the same plane as the lower face 59 described above (e.g., the attachment face 54 and the lower face 59 may define a continuous, flat sheet of material). The attachment face 54 of the terminal 42 may be defined as that portion of the terminal 42 which may be welded or otherwise secured to a portion of the first electrical lead wire 46.

FIG. 4 further illustrates an attachment region 52 located along the portion of the first electrical lead wire 46 which is designed to be welded or otherwise secured to the attachment face 54 of the terminal 42 (FIG. 3 illustrates the attachment region 52 of the first electrical lead wire 46 welded to the terminal 42 along the attachment face 54 shown in FIG. 4). It is noted that FIG. 4 depicts the attachment region 52 located along the portion of the first electrical lead wire 46 as a substantially flat surface. However, as will be shown in greater detail below, the shape of the attachment region 52 of the first electrical lead wire 46 may be the resultant shape of the first electrical lead wire 46 after it has been welded to the attachment face 54 of the terminal 42. In other words, prior to the being welded to the attachment face 54, the first electrical lead wire 46 may be substantially cylindrical-shaped along the attachment region 52.

Further, referring to both FIG. 3 and FIG. 4, it can be appreciated that the terminal 42 may be designed to include a first opening 57*a* and a second opening 57*b* both of which are positioned adjacent to and on either side of the terminal 42 between the attachment face 54 and the first and second engagement arms 56*a*/56*b* of the terminal 42. The openings 57*a*/57*b* may be defined by the specific geometric shape of the first engagement arm 56*a* and the second engagement arm 56*b*. For example, each of the first engagement arm 56*a* and the second engagement arm 56*b* may be shaped (e.g., bent, curved) such that they define (in conjunction with the attachment face 54) the first opening 57*a* and the second opening 57b. Additionally, as shown in FIG. 3 and as will be discussed further with respect to FIG. 8 below, the first opening 57a and the second opening 57b may be designed to permit a portion of the first electrical lead wire 46 to extend therethrough.

As discussed above, FIG. 4 illustrates that the conductive electrical wire assembly 36 may include a band 48. The band 48 may be positioned on a portion of the first electrical lead wire 46. The band 48 may also be positioned on a portion of the second electrical lead wire 44a and/or the third electrical lead wire 44b. It can be appreciated that the band 48 may be designed to wrap around and be fixedly secured to a first end portion 47 and a second end portion 49 of the first electrical lead wire 46 above the splice 50 (i.e., between the splice 50 and the terminal 42). However, it is also contemplated that, in some examples, the clip 48 may be releasably coupled to the second electrical lead wire 44a and/or the third electrical lead wire 44b (i.e., between the splice 50 and the brush 14).

As discussed above (and will be shown in greater detail below with respect to FIGS. 14-15), constructing the conductive electrical lead assembly 36 may include splicing (e.g., ultrasonic welding) end portions of the first electrical lead wire 46 with end portions of the second electrical lead wire 44a and/or the third electrical lead wire 44b. Specifically, FIG. 4 illustrates the spliced (e.g., welded) region 50 of the first electrical lead wire 46 with the second electrical lead wire 44a and the third electrical lead wire 44b. It can be appreciated that the spliced region 50 may be defined as the welded structure (e.g., welded union, welded junction) which results from splicing (e.g., ultrasonic welding) together the first end region 47 of the first electrical wire lead 46, the second end region 49 of the first electrical wire lead 46, the first end region 62a of the second electrical lead wire 44a and the first end region 62b of the third electrical lead wire 44b. It is noted that in some instances, the spliced region 50 may consist of the first end region 47 of the first electrical wire lead 46, the second end region 49 of the first electrical wire lead 46, the first end region 62a of the second electrical lead wire 44a and the first end region 62b of the third electrical lead wire 44b. In other instances, the spliced region 50 may include one or more end regions (such as only one, or both end regions) of the second electrical lead wire 44a and/or the third electrical lead wire 44b spliced with one or more end regions (such as only one, or both end regions) of the first electrical lead wire 46. In other instances, the spliced region 50 may include only one end region of the first electrical lead wire 46 spliced with an end region of only one of the second electrical lead wire 44a or third electrical lead wire 44b.

FIGS. 5-9 and the accompanying description describe example manufacturing steps to attach (e.g., weld) the third electrical lead wire 46 to the terminal 42.

Figure 5:
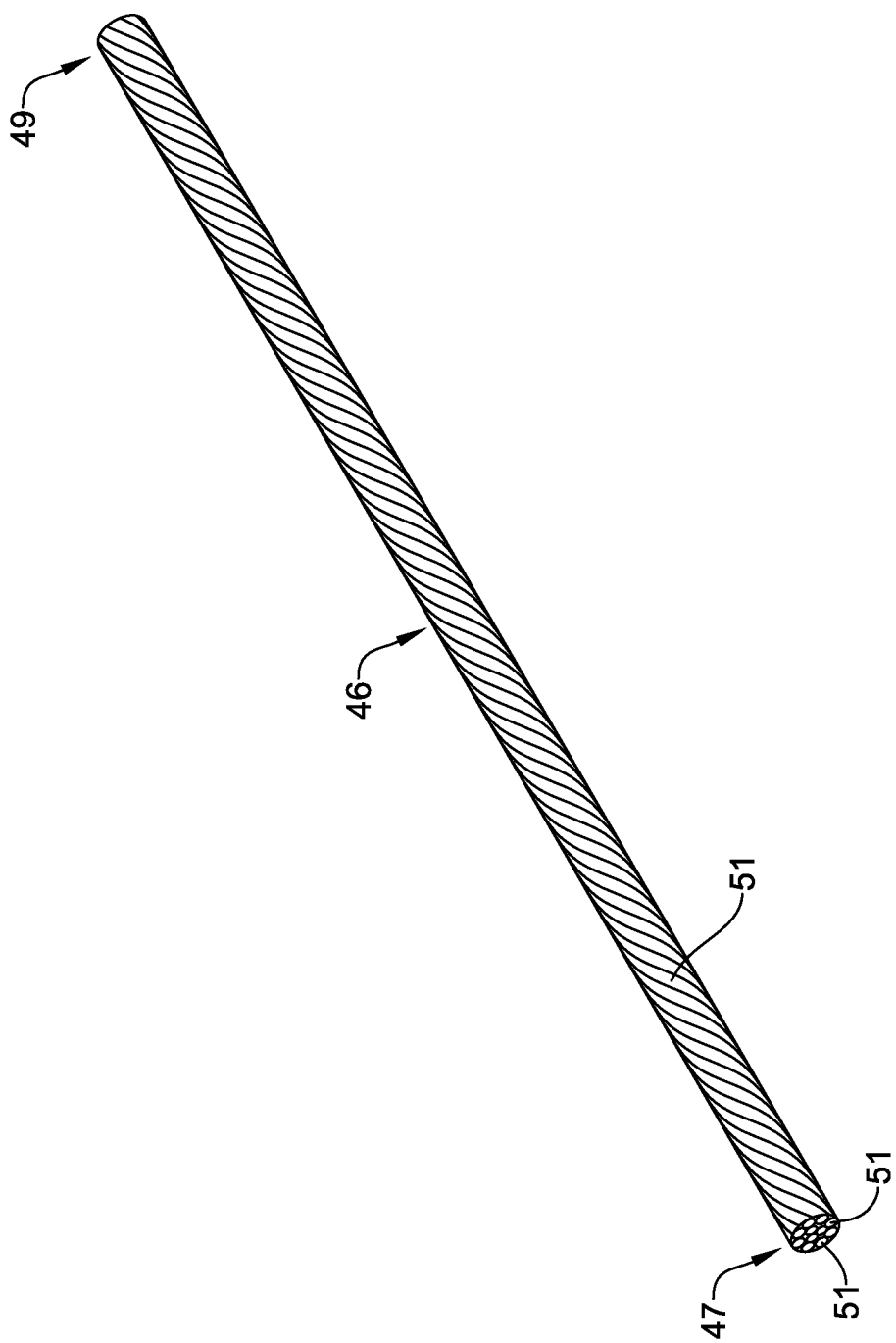
FIG. 5 illustrates a lead wire of the exemplary brush holder assembly of FIG. 1.

FIG. 5 illustrates the first electrical lead wire 46 in a pre-shaped (e.g., raw stock) configuration (e.g., the configuration of the first electrical lead wire 46 prior to being shaped and welded to the terminal 42). As illustrated in FIG. 5, the pre-shaped configuration of the first electrical lead wire 46 may substantially resemble a cylindrical wire having a first end region 47 (described above with respect to FIG. 4) and a second end region 49 (described above with respect to FIG. 4) opposite the first end region 47. In some examples, the first electrical lead wire 46 may be constructed of copper. However, it can be appreciated that, in other examples, the first electrical lead wire 46 may be formed from a variety of different electrically conductive materials. For example, the first electrical lead wire 46 may constructed from aluminum, silver, plated metals, etc.

FIG. 5 further illustrates that the first electrical lead wire 46 may be a multifilar configuration, formed from a plurality of individual wires 51 wound together along the longitudinal axis of the first electrical lead wire 46. FIG. 5 illustrates that the first electrical lead wire 46 includes eleven individual wires 51 wound together to form the first electrical lead wire 46. However, it can be appreciated that the first electrical lead wire 46 may include more or less than eleven individual wires 51 wound together to form the first electrical lead wire 46. For example, the first electrical lead wire 46 may be formed from 1, 2, 3, 4, 5, 6, 7, 8, 9, 10, 11, 12, 13, 14 or more individual wires 51. Additionally, while not shown in the Figures, in some examples, the first electrical lead wire 46 may be formed from a single, solid wire (e.g., the first electrical lead wire 46 may be formed from a single, solid cylindrical wire).

Figure 6:
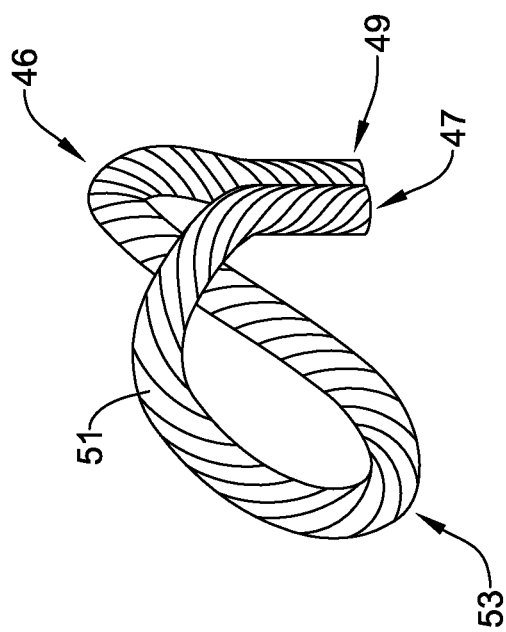
FIG. 6 illustrates the lead wire shown in FIG. 5 shaped for use in the brush holder assembly.

FIG. 6 illustrates the first electrical lead wire 46 shown in FIG. 5 after being shaped (e.g., bent, formed, etc.) into the configuration shown in FIG. 6. As described above, FIG. 6 illustrates the plurality of individual wires 51 which, collectively, are wound together to form the first electrical lead wire 46.

It can be appreciated that the form of the first electrical lead wire 46 shown in FIG. 6 may include a shape which is substantially similar to the shape of the first electrical lead wire 46 shown in FIGS. 1-4 described above (e.g., the shape of the electrical lead wire 46 which is shown in the fully assembled system 10 of FIG. 1). It can further be appreciated that FIG. 6 illustrates the first electrical lead wire 46 prior to being welded to the terminal 42 (the welding of the second electrical wire 46 to the terminal 42 will be described below with respect to FIGS. 8-9). The terminal 42 may be welded to the first electrical lead wire 46 either before or after forming the lead wire into the shape of FIG. 6.

FIG. 6 illustrates that manufacturing the pre-shaped raw stock first electrical lead wire 46 shown in FIG. 5 to the shaped configuration of the first electrical lead wire 46 may include positioning the first end region 47 of the wire 46 adjacent to the second end region 49 of the wire 46. Further, FIG. 6 illustrates that the shaped configuration of the wire 46 may include a curved portion 53 (a portion of which includes the attachment region 52 described above with respect to FIG. 4).

Figure 7:
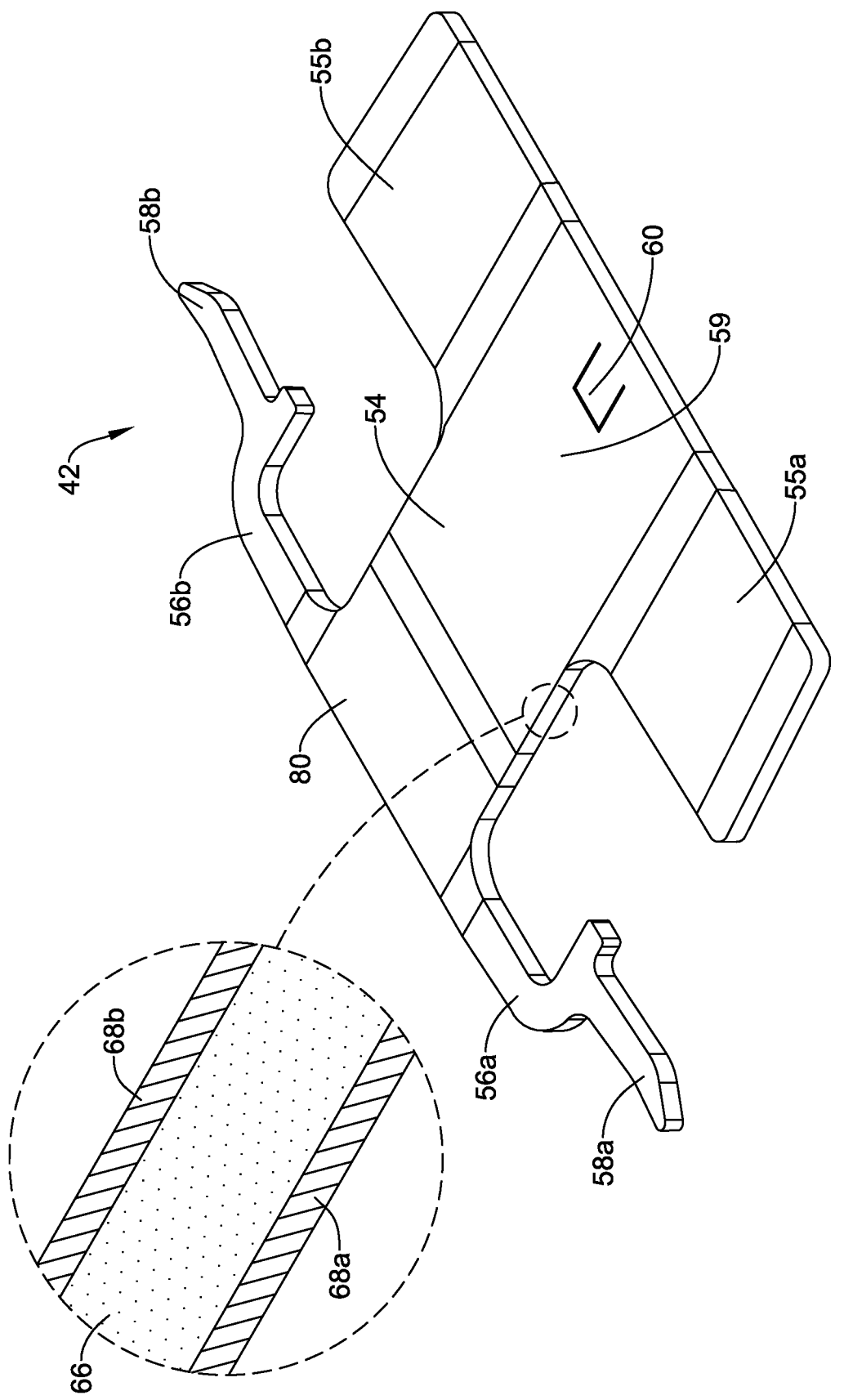
FIG. 7 illustrates a terminal of the exemplary brush holder assembly of FIG. 1.

FIG. 7 illustrates the terminal 42 in a pre-shaped configuration (e.g., the configuration of the terminal 42 prior to being shaped and welded to the first electrical lead wire 46). As shown in FIG. 7, prior to being formed (e.g., bent, shaped, stamped, machined, etc.) into its final assembly configuration (as shown in FIGS. 1-4 above, for example), the terminal 42 may resemble a flat sheet. It can be appreciated that the pre-shaped terminal 42 shown in FIG. 7 may be machined (e.g., cut) from a sheet of raw sheet stock. In other words, the pre-shaped terminal 42 shown in FIGS. 1-4 may initially be machined (e.g., cut) from flat sheet stock into the shape shown in FIG. 7. After being cut into the geometric shape shown in FIG. 7, it may be further bent, shaped, stamped, machined, etc. into the shape of the terminal 42 shown in FIGS. 1-4 above.

FIG. 7 shows the pre-shaped configuration of the terminal 42 includes the lower face 59, a portion of which may be formed into the tab 60 (discussed above with respect to FIG. 4). The pre-shaped configuration of the terminal 42 may also include the first side wall 55a and the second side wall 55b which may be positioned adjacent to and extend away from the lower face 59. FIG. 7 illustrates that the pre-shaped configuration of the terminal 42 may also include the attachment face 54, which may define that portion of the terminal 42 which may be welded to the attachment region 52 (shown in FIG. 4) of the first electrical lead wire 46.

FIG. 7 illustrates that the pre-shaped configuration of the terminal may further include the first engagement arm 56a and the second engagement arm 56b, both of which may be positioned on either side of and extend away from an upper face 80. FIG. 7 illustrates that each of the first engagement arm 56a and the second engagement arm 56b may include a distal end region 58a/58b, respectively.

As described above (and described in greater detail below), an example manufacturing step of the system 10 may include welding (e.g., ultrasonic welding) the first electrical lead wire 46 to the terminal 42, such as to the attachment face 54 of the terminal 42. As discussed above, in some examples, the first electrical lead wire 46 may be formed from copper. It can be appreciated that welding a copper wire to the terminal 42 may require at least a portion of the terminal 42 to be compatible with copper welding. In other words, conventional welding techniques may require that the materials being joined together be compatible with the welding process. In some instances, constructing at least a portion of the terminal 42 from a copper and/or copper alloy may be advantageous when welding the first electrical lead wire 46 to the terminal 42. In some examples, the copper and copper alloys utilized herein may include non-ferrous copper and copper alloys.

The detailed view of FIG. 7 illustrates that, in some examples, the terminal 42 may be formed from a copper cladded material. For example, the detailed view of FIG. 7 illustrates a cross-section of the wall of the terminal 42. The cross-sectional view shown in the detailed view of FIG. 7 illustrates that the terminal 42 may include a first copper layer 68a, a second copper layer 68b and an inner core material 66 positioned between the first and second copper layers 68a/68b. It can be appreciated that the inner core material 66 may be "sandwiched" between the first copper layer 68a and the second copper layer 68b, with the first copper layer 68a extending conterminously over an entirety of a first side of the inner core material 66 and the second copper layer 68b extending conterminously over an entirety of a second, opposite side of the inner core material 66. The inner core material 66 may be steel, such as a resilient steel, or other metallic material. In one instance, the inner core material 66 may be 1065 steel having an ultimate tensile strength of about 630 to 690 MPa, a yield tensile strength of about 380 to 490 MPa, and a modulus of elasticity of about 190 to 210 GPa. In some examples, the material configuration of the terminal 42 shown in the detailed view of FIG. 7 may be referred to as a "copper plated" or "copper cladded" material. It can be further appreciated that forming the terminal 42 from a multi-layer material (e.g., a plated material, a cladded material, copper-cladded steel) may result in the exposed edges of the terminal 42 showing each layer of the material which forms the multi-layer material. In the example described here, an exposed edge of a copper-cladded steel sheet would show the first copper layer 68a, the edge of the second copper layer 68b and the inner core material 66 (e.g., steel).

It can further be appreciated that, after the terminal 42 has been formed into its assembled configuration (as shown in FIGS. 1-4) the second copper layer 68b may define the inner facing surfaces of the terminal 42 which may come into contact and/or be joined to the first electrical lead wire 46. For example, it can be appreciated that the second copper layer 68b may be formed from a copper alloy which may be welded to the copper wires 51 from which the first electrical lead wire 46 is formed.

In some examples, after the terminal 42 has been formed into its assembled configuration (as shown in FIGS. 1-4), the entire outer surface area of the terminal 42 may be plated with nickel. In some examples, the nickel used to plate the terminal 42 may be a low-phosphorus nickel. The low-phosphorus nickel may help prevent corrosion. Additionally, it can be appreciated that plating the entire outer surface of the terminal 42 with a low-phosphorus nickel material may facilitate the first electrical lead wire 46 being ultrasonically welded to the terminal 42. In some examples, the thickness of the nickel plating may be about 0.25-30 microns, or about 0.50-15 microns, or about 0.75-10 microns, or about 1-5 microns, or less than 5 microns.

Additionally, it can be appreciated from FIG. 7 and the above discussion that because the first copper layer 68a is separated from the second copper layer 68b, an electrical current which passes through the nickel plating and arrives at the second copper layer 68b (via the conductive electrical lead assembly 36, for example) will pass through the inner core layer 66 to the first copper layer 68a. Therefore, electrical current may pass from the surface 18 of a rotating component 20 of an electrical machine, through the brush 14, through the second electrical lead wire 44a and/or the third electrical lead wire 44b, through the first electrical lead wire 46, through the nickel plated layer, through the second copper layer 68b, through the inner core layer 66, through the first copper layer 68a, to the nickel plated layer, whereby the electrical current may then contact the mounting block and pass the electrical current thereon.

In some examples, the inner core material 66 may be formed from steel, such as 1065 steel, 1080 steel, or similar steel materials. As discussed above, the inner core material 66 may include a first face and an opposite second face, each of which may be covered with a material which is different than the inner core material 66. While the examples described above describe the inner core material 66 being covered by a copper material (i.e., copper and/or copper alloys), it is contemplated that a variety of materials (e.g., metals, metal alloys, etc.) may be utilized to cover each face of the inner core material 66. Example materials that may be utilized to cover each face of the inner core material 66 may include silver, aluminum, cadmium alloys, or similar metals and metal alloys.

In some examples, the ratio of the composition of the inner core material 66 to the first copper layer 68a and the second copper layer 68b may be 80/10/10. In other words, of the entire thickness of the terminal 42 (not including the nickel plated layer of material), the first copper layer 68a may compose 10% of the entire thickness, the second copper layer 68b may compose 10% of the entire thickness, and the inner core material 66 may compose 80% of the entire thickness of the terminal 42. The thicknesses of the various layers may be adjusted as desired. For example, in some instances, the thickness of the first copper layer 68a may be about 5%, the thickness of the second copper layer 68b may be about 5%, and the thickness of the inner core material 66 may be about 90%. In other instances, the thickness of the first copper layer 68a may be about 15%, the thickness of the second copper layer 68b may be about 15%, and the thickness of the inner core material 66 may be about 70%, or example. In other instances, the thickness of the first copper layer 68a may be about 5% to 15%, the thickness of the second copper layer 68b may be about 5% to 15%, and the thickness of the inner core material 66 may be about 70% to 90%.

Figure 8:
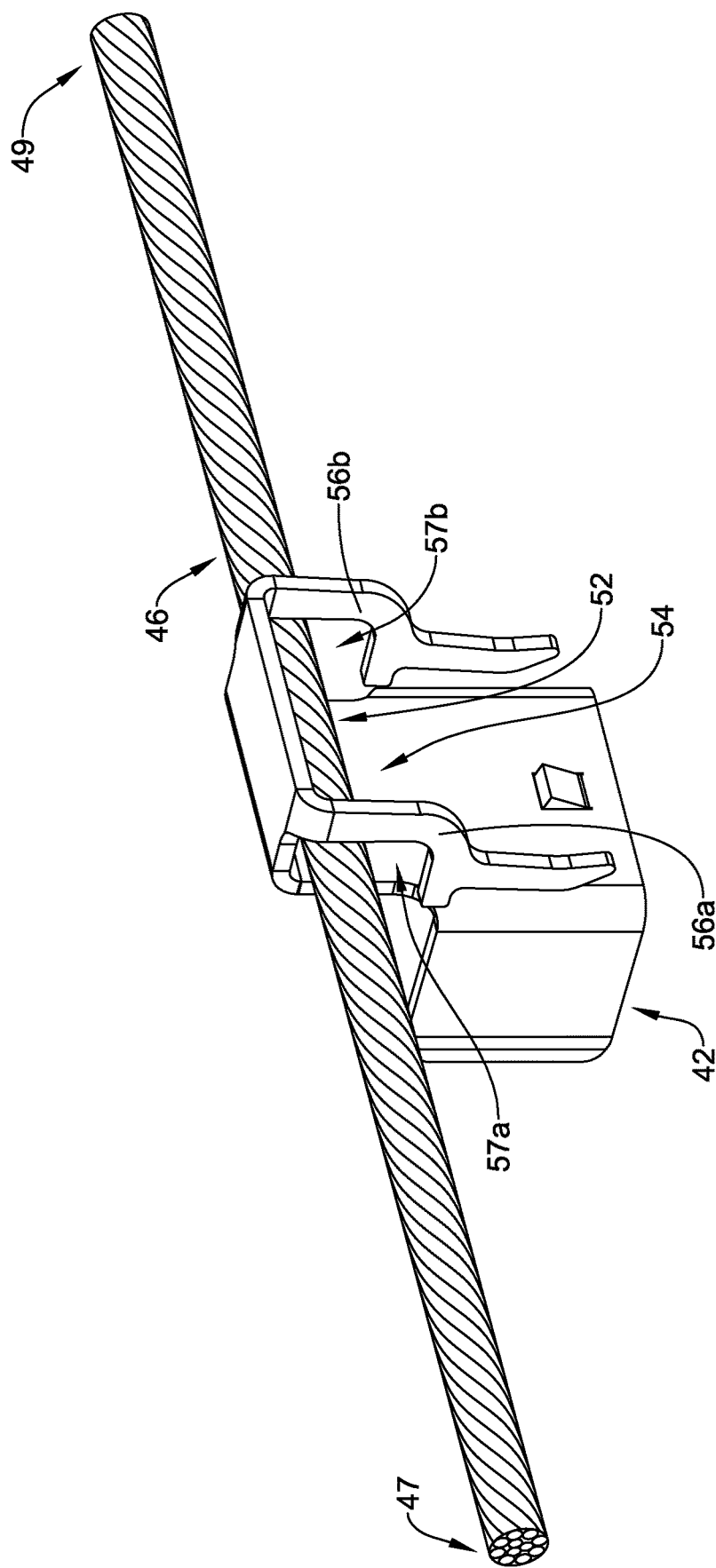
FIG. 8 illustrates joining the terminal of FIG. 7 to the lead wire of FIGS. 5 and 6 prior to being secured to the lead segment during a manufacturing step.

FIG. 8 illustrates another example manufacturing step in the process of attaching (e.g., welding) the first electrical lead wire 46 to the terminal 42. FIG. 8 illustrates that prior to welding the first electrical lead wire 46 to the terminal 42, the first electrical lead wire 46 may be positioned through the opening 57*a* and the opening 57*b* of the terminal 42 such that the attachment region 52 of the first electrical lead wire 46 is aligned with (e.g., juxtaposed with) the attachment face 54 of the terminal 42. As descried above, it can be appreciated that the openings 57*a*/57*b* of the terminal 42 may be defined by each of the first engagement arm 56*a* and the second engagement arm 56*b*, respectively.

It can be further appreciated from FIG. 8 that prior to welding the first electrical lead wire 46 to the terminal 42, the first electrical lead wire 46 may extend longitudinally along the attachment face 54 of the terminal 42 with the first end region 47 extending from a first side of the terminal 42 and the second end region 49 extending from the opposite, second side of the terminal 42. Thus, the attachment region 52 of the first electrical lead wire 46, which may be a medial region of the first electrical lead wire 46, may be aligned with the terminal 42 such that the opposing end regions extend in both directions from the terminal 42. The end regions of the first electrical lead wire 46 extending from the terminal 42 may each have a length of 1 inch or more, 2 inches or more, or 3 inches or more, for example. It can be appreciated that achieving the pre-welded set-up configuration illustrated in FIG. 8, the raw stock electrical wire 46 shown in FIG. 5 may be inserted through each of the openings 57*a*/57*b* of the terminal 42 until the attachment region 52 of the first electrical lead wire 46 is properly aligned with the attachment face 54 of the terminal 42. Thus, the terminal 42 may be generally centered between the first end region 47 and the second end region 49 of the first electrical lead wire 46 with generally an equal length of the first electrical lead wire 46 extending from both sides of the terminal 42.

Figure 9:
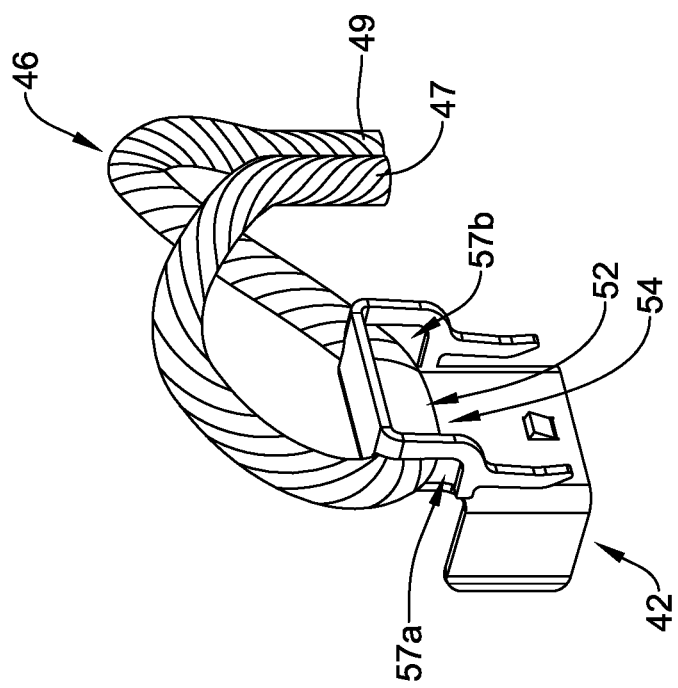
FIG. 9 illustrates the terminal and lead wire shown in FIG. 8 after being secured together.

FIG. 9 illustrates another example manufacturing step in the process of attaching (e.g., welding) the first electrical lead wire 46 to the terminal 42. Specifically, FIG. 9 illustrates the first electrical lead wire 46 after the attachment region 52 of the lead wire 46 has been welded or otherwise secured to the attachment face 54 of the terminal 42 and the first electrical lead wire 46 has been formed into a curved configuration (the shape of which resembles the fully assembled first electrical lead wire shown in FIGS. 1-4 above).

As described above, FIG. 9 illustrates that after welding and bending the first electrical lead wire 46, the first electrical lead wire 46 remains positioned through the opening 57*a* and the opening 57*b* of the terminal 42 with opposing end regions 47/49 of the first electrical lead wire 46 extending from the terminal 42. In other words, after welding and bending the electrical lead wire 46 into the configuration shown in FIG. 9, the portions of the first electrical lead wire 46 extending away from the attachment face 54 pass through each of the openings 57*a*/57*b*, respectively, before assuming a curved shape whereby the first end region 47 is aligned with the second end region 49.

Figure 10:
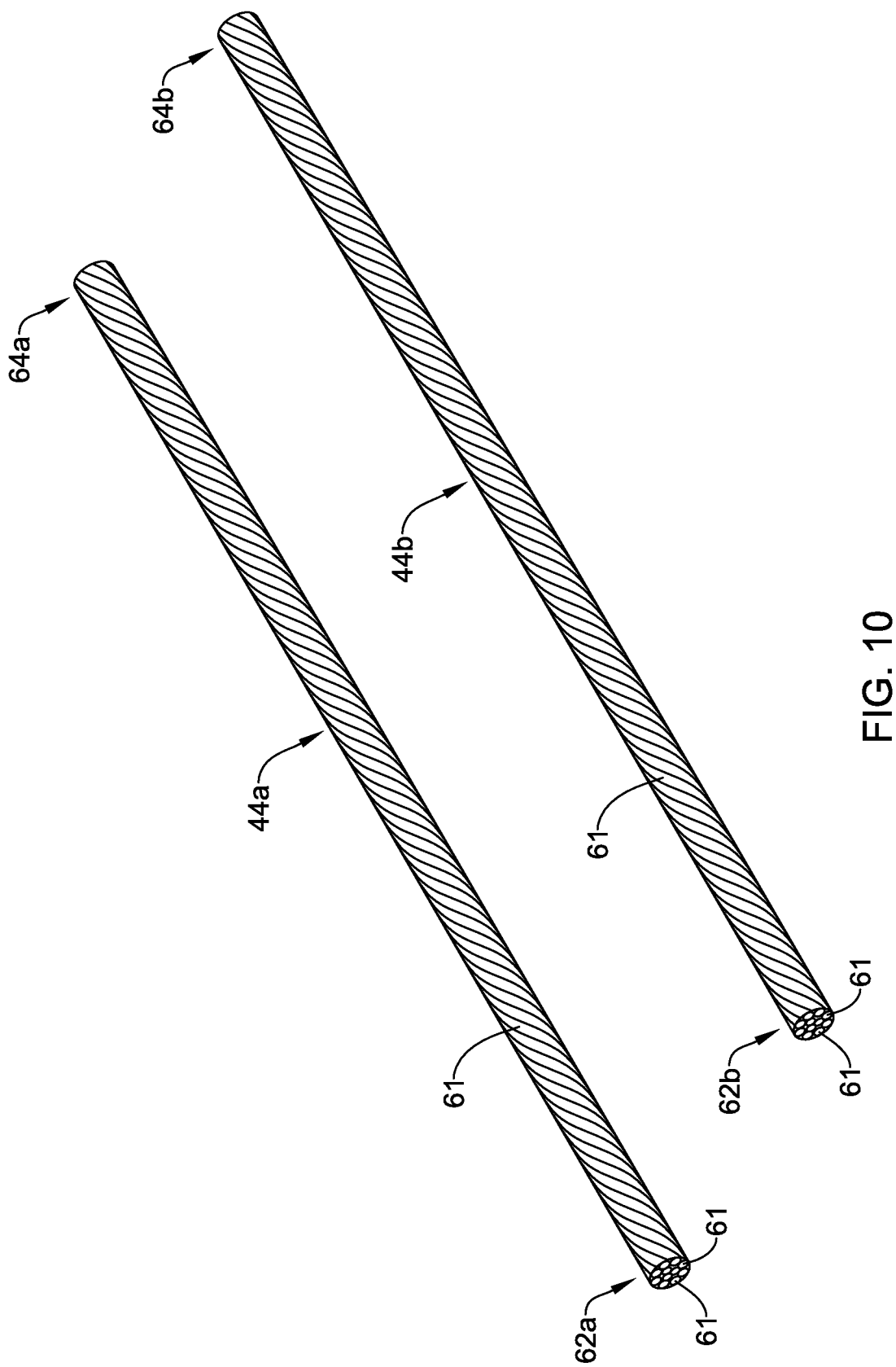
FIG. 10 illustrates additional lead wires of the exemplary brush holder assembly of FIG. 1.
Figure 11:
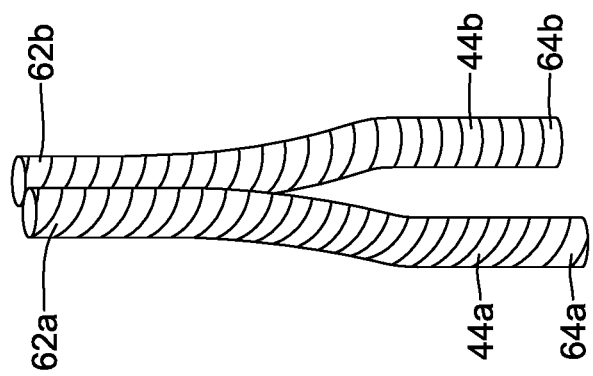
FIG. 11 illustrates the component shown in FIG. 10 shaped for use in the brush holder assembly.
Figure 12:
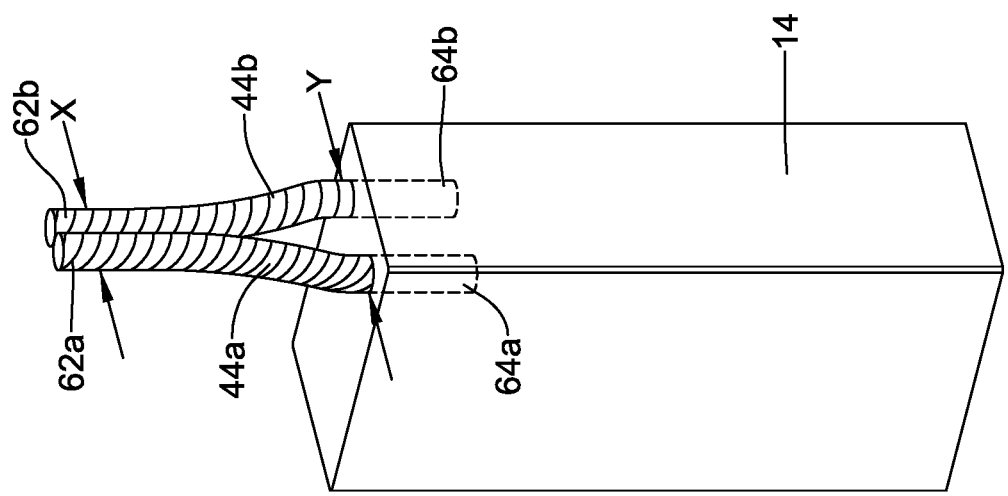
FIG. 12 illustrates the lead wires shown in FIG. 10 after being attached to the brush of the exemplary brush holder assembly of FIG. 1.

FIGS. 10-12 and the accompanying description describe example manufacturing steps to attach the second electrical lead wire 44*a* and/or the third electrical lead wire 44*b* to the brush 14.

FIG. 10 illustrates exemplary second and third electrical lead wires 44*a*/44*b* in a pre-shaped (e.g., raw stock) configuration prior to the second electrical lead wire 44*a* and/or the third electrical lead wire 44*b* being shaped and attached to the brush 14. As illustrated in FIG. 10, the pre-shaped configuration of each of the second electrical lead wire 44*a* and the third electrical lead wire 44*b* may substantially resemble a cylindrical wire having a first end portion 62*a*/62*b* (described above with respect to FIG. 4) and a second end portion 64*a*/64*b* (described above with respect to FIG. 4) opposite the first end portion 62*a*/62*b*. In some examples, the second and third electrical lead wires 44*a*/44*b* may be constructed of copper. However, it can be appreciated that, in other examples, the second and third electrical lead wires 44*a*/44*b* may be formed of a variety of different electrically conductive materials. For example, the second and third electrical lead wires 44*a*/44*b* may constructed from aluminum, silver, etc.

FIG. 10 further illustrates that the second and third electrical lead wires 44*a*/44*b* may be a multifilar configuration, formed from a plurality of individual wires 61 wound together along the longitudinal axis of the electrical lead wire 44*a*/44*b*. FIG. 10 illustrates that the second and third electrical lead wires 44*a*/44*b* each includes eleven individual wires 61 wound together to form the electrical lead wire 44*a*/44*b*. However, it can be appreciated that the second and third electrical lead wires 44*a*/44*b* may include more or less than eleven individual wires 61 wound together to form the electrical lead wire 44*a*/44*b*. For example, the second and third electrical lead wires 44*a*/44*b* may each be formed from 1, 2, 3, 4, 5, 6, 7, 8, 9, 10, 11, 12 or more individual wires 61. While not shown in the Figures, in some examples, the second and third electrical lead wires 44 may be formed from a single, solid wire (e.g., the electrical lead wire 44*a*/44*b* may be formed from a single, solid cylindrical wire).

FIG. 11 illustrates the second electrical lead wire 44*a* positioned adjacent to the third electrical lead wire 44*b* after being shaped (e.g., bent, formed, etc.) into the configuration shown in FIG. 11. As described above, FIG. 11 illustrates that each of the second electrical lead wire 44*a* and the third electrical lead wire 44*b* may be formed from a plurality of individual wires 61 which, collectively, form the electrical lead wires 44*a*/44*b*.

It can be appreciated that the form of the second electrical lead wire 44*a* and the third electrical lead wire 44*b* shown in FIG. 11 may include a shape which is substantially similar to the shape of the second electrical lead wire 44*a* and the third electrical lead wire 44*b* shown in FIGS. 1-4 described above (e.g., the shape of the second electrical lead wire 44*a* and the third electrical lead wire 44*b* which is shown in the fully assembled system 10 of FIG. 1). It can further be appreciated that FIG. 11 illustrates the second electrical lead wire 44*a* and the third electrical lead wire 44*b* prior to being attached to the brush 14.

FIG. 11 illustrates that manufacturing two individual pre-shaped raw stock electrical lead wires 44*a*/44*b* shown in FIG. 10 into the shaped configuration of the second electrical lead wire 44*a* and the third electrical lead wire 44*b* may include positioning a first end region 62*a* of the second electrical lead wire 44*a* adjacent to a first end region 62*b* of the third electrical lead wire 44*b*.

FIG. 12 illustrates an example manufacturing step in which a portion of the second electrical lead wire 44*a* and the third electrical lead wire 44*b* is secured to the brush 14. Attaching the second electrical lead wire 44*a* and the third electrical lead wire 44*b* to the brush 14 may include positioning each of the second electrical lead wire 44*a* and the third electrical lead wire 44*b* into a respective cavity (e.g., a pre-formed hole, bore and/or aperture) in the brush 14, whereby after placing the second end region 64*a*/64*b* of each of the second wire 44*a* and the third wire 44*b* into its respective cavity in the brush 14, each of the individual cavities is filled (e.g., packed) with additional powder material (e.g., carbon powder material), thereby securing the second end regions 64a/64b of both the second electrical lead wire 44a and the third electrical lead wire 44b to the brush 14. The embedded second end regions 64a/64b of the second electrical lead wire 44a and the third electrical lead wire 44b in the brush 14 is depicted by the dashed lines, of FIG. 12. In other words, FIG. 12 illustrates that the brush 14 may include two or more separate electrical lead wires extending from the brush 14, with an end region of each of the separate lead wires embedded in, or otherwise secured to the brush 14. A free, opposite end of each separate lead wire may extend from the brush 14 to be secured to another electrical lead wire at the slice region 50. In other instances, only a single electrical lead wire (such as the second electrical lead wire 44a) may be secured to the brush 14 (e.g., have an end region embedded in a bore of the brush 14) and extend from the brush 14 to be secured to another electrical lead wire (which is extending from the terminal 42) at the slice region 50.

FIG. 12 further illustrates that after attaching the second electrical lead wire 44a and/or the third electrical lead wire 44b to the brush 14, the first end region 62a of the second electrical lead wire 44a may be positioned adjacent to the first end region 62b of the third electrical lead wire 44b. Further, FIG. 12 illustrates that the respective ends of the second electrical lead wire 44a and the third electrical lead wire 44b may be spaced away from one another at the point at which each segment of the second electrical lead wire 44a and the third electrical lead wire 44b exits the brush 14. The outer lateral distance defining the spaced apart ends of the second electrical lead wire 44a and the third electrical lead wire 44b is depicted as dimension Y in FIG. 12. However, FIG. 12 further illustrates that the respective ends 62a/62b of the second electrical lead wire 44a and the third electrical lead wire 44b may converge and curve toward a centerline of the brush 14, whereby the first end regions 62a/62b of the second and third electrical lead wires 44a/44b are positioned next to one another. The outer lateral distance between the end regions 62a/62b of the second electrical lead wire 44a and the third electrical lead wire 44b where the first end regions 62a/62b are positioned next to one another is depicted as dimension X in FIG. 12. It can be appreciated that, in some examples, the dimension Y may be greater than dimension X.

Figure 13:
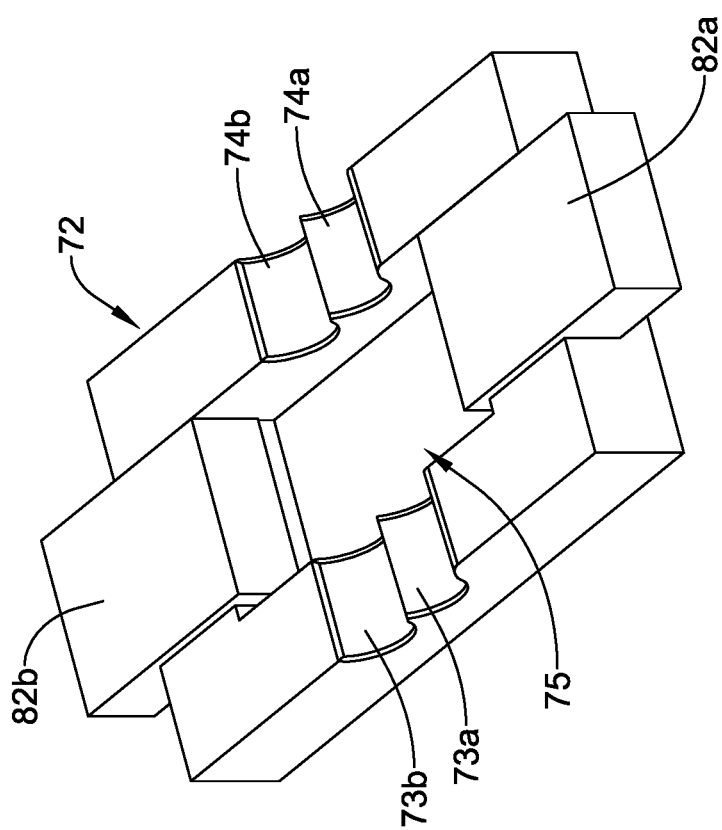
FIG. 13 is an example fixture for securing the ends of the lead wires of the exemplary brush holder assembly of FIG. 1 together.
Figure 14:
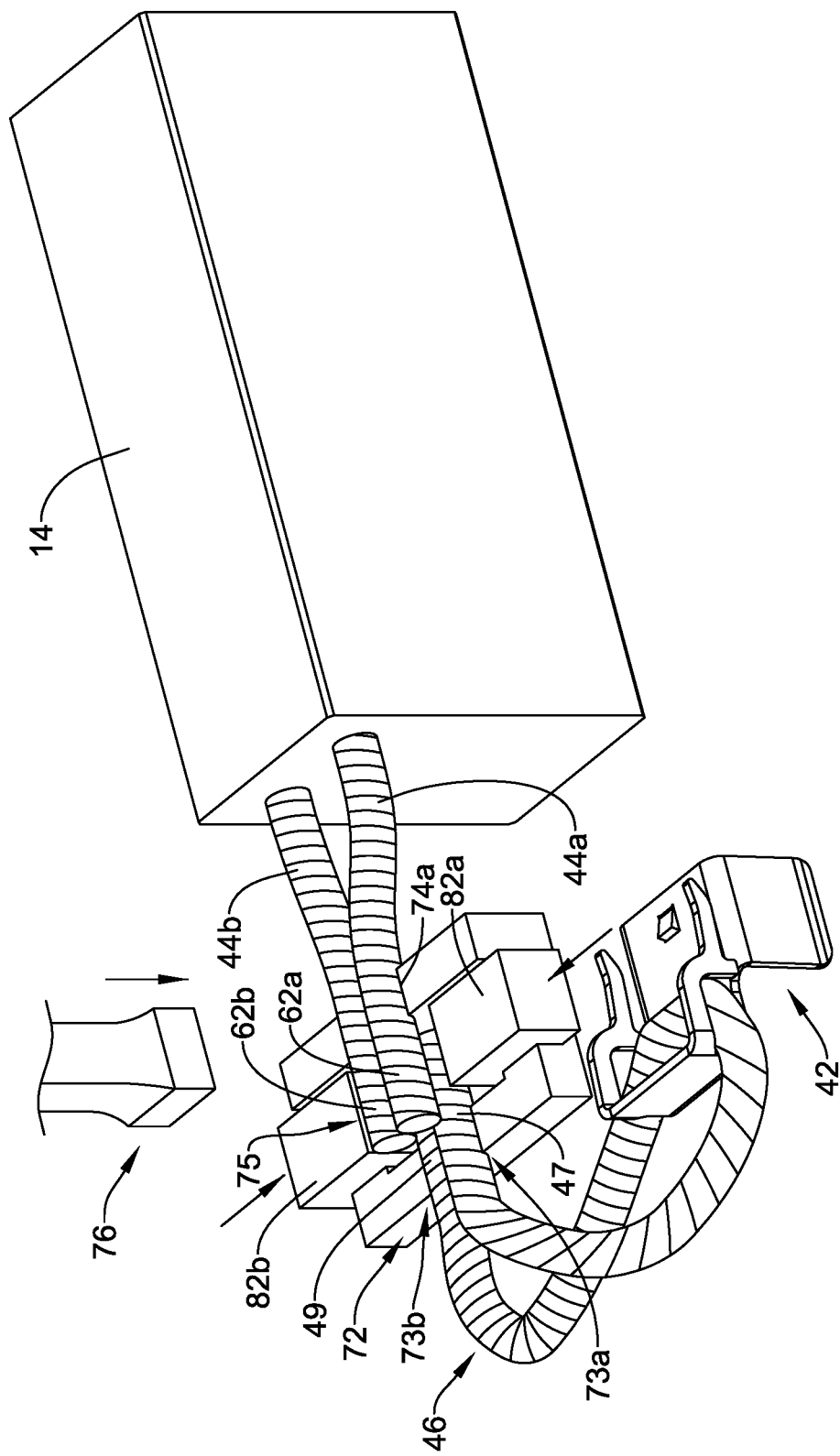
FIG. 14 illustrates the lead wires of the exemplary brush holder assembly positioned along the exemplary fixture shown in FIG. 13 prior to being secured together.
Figure 15:
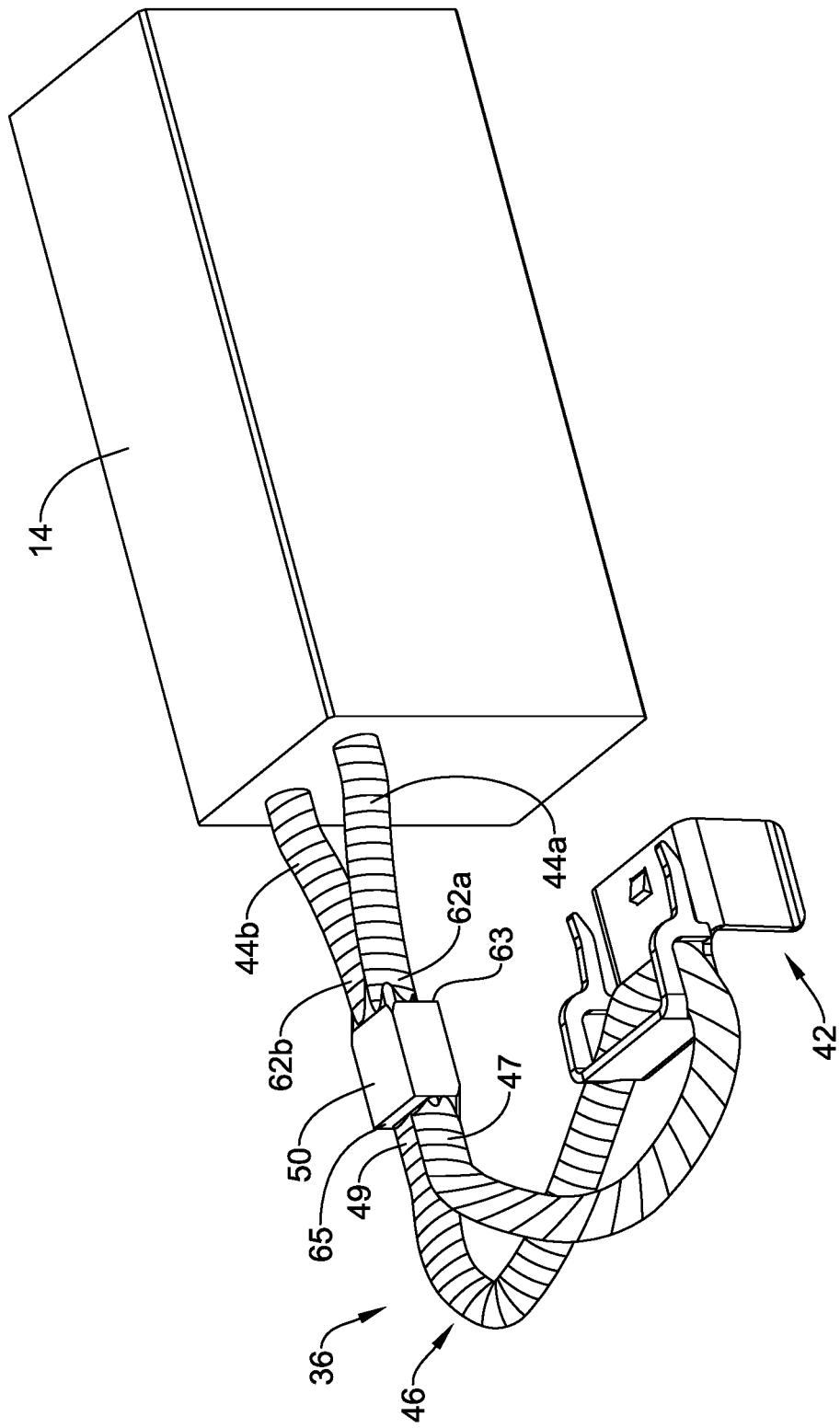
FIG. 15 illustrates the lead wires of the brush holder assembly shown in FIG. 14 after being secured together.

FIGS. 13-15 and the accompanying description describe example manufacturing steps to weld (e.g., ultrasonically weld) the second electrical lead wire 44a and the third electrical lead wire 44b to the first electrical lead wire 46.

FIG. 13 illustrates an example welding fixture 72. As will be show in FIG. 14 below, the example fixture 72 may be configured to secure the terminal first ends of the second electrical lead wire 44a and the third electrical lead wire 44b with the first and second terminal ends of the first electrical lead wire 46 while they are welded together. Further, the fixture 72 may be designed such that it aligns the first terminal ends of the second electrical lead wire 44a and the third electrical lead wire 44b with the first and second terminal ends of the first electrical lead wire 46 while they are welded together.

FIG. 13 illustrates that the fixture 72 may include a first pair of alignment channels 73a/73b. As will be shown in FIG. 14, below, the first pair of alignment channels 73a/73b may be designed to position (e.g., align) the first end region 47 and the second end region 49, respectively, of the first electrical lead wire 46 within the cavity of the fixture 72. Additionally, FIG. 13 further illustrates that the fixture 72 may include a second pair of alignment channels 74a/74b. As will be shown in FIG. 14 below, the first pair of alignment channels 73a/73b may be designed to position (e.g., align) the first end region 62a and the first end region 62b, respectively, of the second electrical lead wire 44a and the third electrical lead wire 44b within the cavity of the fixture 72.

In other instances, the fixture 72 may include a single alignment channel for receiving both the first end region 47 and the second end region 49 of the first electrical lead wire 46 within the cavity of the fixture 72 in a side-by-side arrangement. Furthermore, the fixture may include a single alignment channel for receiving both the first end region 62a of the second electrical lead wire 44a and the first end region 62b of the third electrical lead wire 44b within the cavity of the fixture 72 in a side-by-side arrangement.

Additionally, the fixture 72 shown in FIG. 13 may be designed such that the alignment channels 74a/74b (or single alignment channel for the first end regions 62a/62b of the second and third electrical lead wires 44a/44b) may be spaced away from the first pair of alignment channels 73a/73b (or single alignment channel for the first and second end regions 47/49 of the first electrical lead wire 46) to define a welding zone 75 in the cavity of the fixture 72. The alignment of the first terminal ends of the second electrical lead wire 44a and the third electrical lead wire 44b and ends of the first electrical lead wire 46 within the welding zone 75 prior to welding is described below with respect to FIG. 14.

Additionally, the fixture 72 may include one or more clamping members 82a/82b for clamping or otherwise aligning the terminal ends of the first lead wire 46, the second lead wire 44a and the third lead wire 44b together during the welding process. For example, the fixture 72 may include a first clamping member 82a on a first side of the welding zone 75 and a second clamping member 82b on a second side of the welding zone 75. The first and second clamping members 82a/82b may be actuatable toward one another to clamp, compress or otherwise align the terminal ends of the first lead wire 46, the second lead wire 44a and the third lead wire 44b therebetween within the fixture 72.

FIG. 14 illustrates the first end 62a of the second electrical lead wire 44a, the first end 62b of the third electrical lead wire 44b and the first and second ends 47/49 of the first electrical lead wire 46 positioned within the welding zone 75 prior to welding via a welding device 76. Specifically, FIG. 14 illustrates the first end region 62a of the second electrical lead wire 44a positioned within the alignment channel 74a of the fixture 72, the first end region 62b of the third electrical lead wire 44b positioned within the alignment channel 74b of the fixture 72, the first end region 47 of the first electrical lead wire 46 positioned within the alignment channel 73a of the fixture 72 and the second end region 49 of the first electrical lead wire 46 positioned within the alignment channel 7b of the fixture 72.

As noted above, in other instances the both the first end region 47 and the second end region 49 of the first electrical lead wire 46 may be positioned in the welding zone 75 through a single alignment channel in a side-by-side arrangement. Furthermore, the both the first end region 62a of the second electrical lead wire 44a and the first end region 62b of the third electrical lead wire 44b may be positioned in the welding zone 75 through a single alignment channel in a side-by-side arrangement.

FIG. 14 further illustrates that the first end region 62a of the second electrical lead wire 44a and the first end region 62b of the third electrical lead wire 44b (having been previously secured to the brush 14) are positioned overtop (i.e., positioned vertically above and overlapping) the first end region 47 and the second end region 49 of the first electrical lead wire 46 (having been previously secured to the terminal 42). In other words, the first end region 47 and the second end region 49 of the first electrical lead wire 46 are positioned underneath the first end region 62a of the second electrical lead wire 44a and the first end region 62b of the third electrical lead wire 44b. Referring back to FIG. 13, it can be appreciated that the fixture 72 may be designed to position the end regions 47/49 of the first electrical lead wire 46 underneath the end regions 62a/62b of the second and third electrical lead wires 44a/44b by raising the second pair of alignment channels 74a/74b (or single alignment channel for the end regions 62a/62b of the second and third electrical lead wires 44a/44b) higher relative to the first pair of alignment channels 73a/73b (or single alignment channel for receiving the end regions 47/49 of the first electrical lead wire 46). It is noted that in another embodiment, the fixture 72 may be designed to position the end regions 47/49 of the first electrical lead wire 46 above the end regions 62a/62b of the second and third electrical lead wires.

Additionally, FIG. 14 illustrates that, in some examples, prior to welding, the first end region 62a of the second electrical lead wire 44a and the first end region 62b of the third electrical lead wire 44b may overlap (e.g., extend beyond) a portion of the first end region 47 and the second end region 49 of the first electrical lead wire 46 within the welding zone 75. In other words, prior to welding, each of the first end region 62a of the second electrical lead wire 44a, the first end region 62b of the third electrical lead wire 44b, the first end region 47 of the first electrical lead wire 46 and the second end region 49 of the first electrical lead wire 46 may be positioned within the welding zone 75 such that the first end region 62a of the second electrical lead wire 44a and the first end region 62b of the third electrical lead wire 44b may extend along beside the first end region 47 and the second end region 49 of the first electrical lead wire 46.

FIG. 14 further illustrates that prior to welding the second electrical lead wire 44a and the third electrical lead wire 44b to the first electrical lead wire 46, the first electrical lead wire 46 may be attached to (e.g., welded to) the terminal 42 (as described above) and the second electrical lead wire 44a and the third electrical lead wire 44b may be attached to (e.g., embedded in) the brush 14. The fixture 42 may be designed to permit the welding of the first electrical lead wire 46 to the second electrical lead wire 44a and/or the third electrical lead wire 44b after the first electrical lead wire 46 has been attached to the terminal 42 and the second electrical lead wire 44a and/or the third electrical lead wire 44b have been attached to the brush 14.

Once the end regions 62a/62b of the second and third electrical lead wires 44a/44b and the end regions 47/49 of the first electrical lead wire 46 are aligned in the cavity of the fixture 72, the clamping members 82a/82b may be actuated to clamp, compress or otherwise align the end regions 62a/62b and the end regions 47/49 together. Furthermore, a welding device 76, such as an ultrasonic welder, may be advanced toward the welding zone 75 to press against the end regions 62a/62b of the second and third electrical lead wires 44a/44b (or the end regions 47/49 of the first electrical lead wire 46) if positioned above the end regions 62a/62b of the second and third electrical lead wires 44a/44b) and close the top of the cavity of the fixture 72 defining the welding zone 75. While being compressed together, the end regions 62a/62b and the end regions 47/49 may be welded together with the welding device 76 (e.g., an ultrasonic welder). For instance, the welding device 76 may be vibrated at a high frequency in a back-and-forth motion in a direction parallel to the axes of the end regions of the electrical lead wires 44a/44b/46 in the fixture 72 to ultrasonically weld the end regions together.

FIG. 15 illustrates the first end region 62a of the second electrical lead wire 44a, the first end region 62b of the third electrical lead wire 44b, the first end region 47 of the first electrical lead wire 46 and the second end region 49 of the first electrical lead wire 46 after they have all been welded together by the welding device 76 (shown in FIG. 14) to form a welded (e.g., spliced) region 50. The welded region 50 may be referred to as a welded union, welded junction, etc. It can be appreciated that the assembly shown in FIG. 15 illustrates the conductive lead assembly 36 whereby the first electrical lead wire 46 is directly attached to the terminal 42 and the second electrical lead wire 44a and the third electrical lead wire 44b are directly attached to the brush 14. Thus, the second electrical lead wire 44a and the third electrical lead wire 44b may be directly attached to the brush 14 but not extend all the way to the terminal 42. Likewise, the first electrical lead wire 46 may be directly attached to the terminal 42, but not extend all the way to the brush 14. In other words, the second electrical lead wire 44a and/or the third electrical lead wire 44b may only extend between the weld splice 50 to the brush 14 and the first electrical lead wire 46 may only extend between the weld splice 50 and the terminal 42. It can be appreciated that the assembly illustrated in FIG. 15 may be integrated with the remaining components of the brush holder assembly 12 (e.g., the brush holder 16, the lower beam 32, the upper beam 30 and handle 22) described above.

Figure 16A:
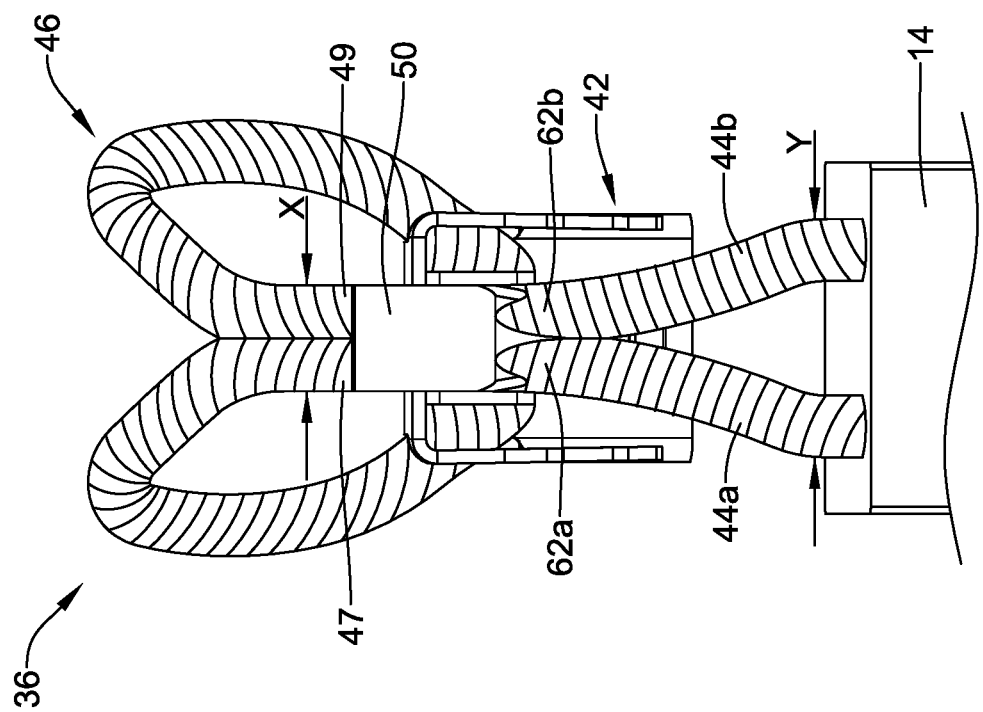
FIG. 16A is a front view of the brush assembly of the exemplary brush holder shown in FIG. 15.
Figure 16B:
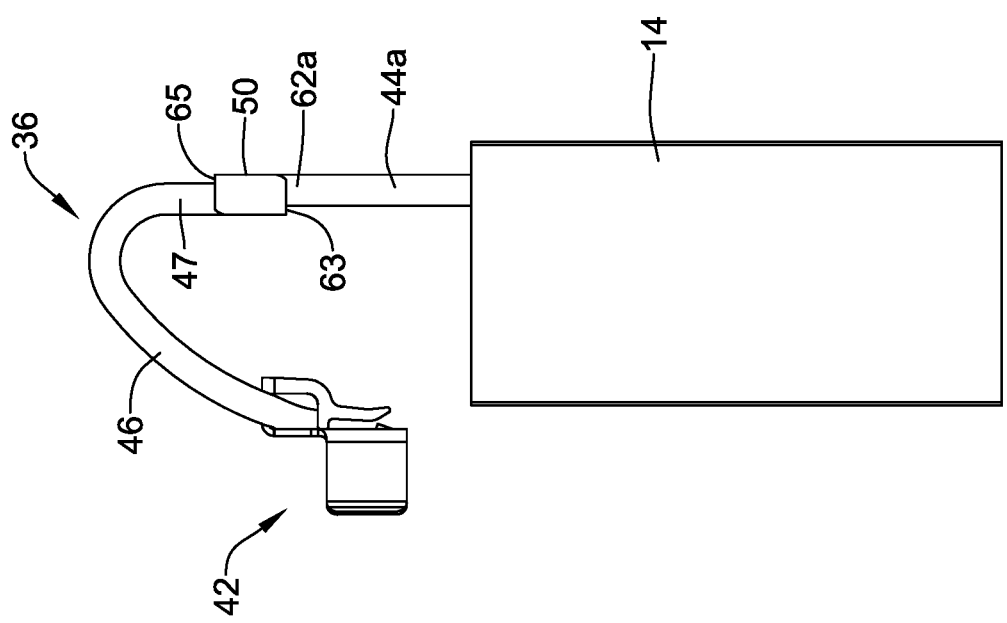
FIG. 16B is a side view of the brush assembly of the exemplary brush holder shown in FIG. 15.

FIG. 16A illustrates a front view of the assembly shown in FIG. 15, while FIG. 16B illustrates a side view of the assembly shown in FIG. 15. Specifically, FIG. 16A illustrates a front view of the first electrical lead wire 46 and the second and third electrical lead wires 44a/44b, whereby the first end region 62a of the second wire 44a, the first end region 62b of the third wire 44b, the first end region 47 of the first wire 46 and the second end region 49 of the first wire 46 terminate at the welded splice region 50.

Further (and referring back to the discussion with respect to FIG. 12), FIG. 16A illustrates that the two respective ends of the second electrical lead wire 44a and the third electrical lead wire 44b may be spaced away from one another at the point at which each end region exits the brush 14. As discussed with respect to FIG. 12, the outer width which defines the spaced apart ends of the second electrical lead wire 44a and the third electrical lead wire 44b is depicted as dimension Y in FIG. 16A (this is the same dimension Y shown in FIG. 12).

Further, FIG. 16A illustrates that the outer lateral dimension defined by the outer edges of the first end region 47 of the first electrical lead wire 46, the second end region 49 of the first electrical lead wire 46, the first end region 62a of the second electrical lead wire 44a, the first end region 62b of the third electrical lead wire 44b and the welded region 50 are all less than the dimension Y. It can be appreciated that keeping the width of the welded region 50 (and width of the first end region 47 of the first wire 46, the second end region 49 of the first wire 46, the first end region 62a of the second wire 44a and the first end region 62b of the third wire 44b which terminate at the welded region 50) less than width Y may prevent the portions of the first electrical lead wire 46, the second electrical lead wire 44a and the third electrical lead wire 42b from catching on the brush holder 16 (shown in FIG. 1) or the rim of the brush holder 16 as the brush 14 translates (and effectively pulls the first wire 46, the second wire 44*a* and the third wire 44*b*) into the internal space defined by the side walls of the brush holder 16 and toward the surface 18 (shown in FIG. 1) of a rotating component 20 (shown in FIG. 1) of an electrical machine.

Furthermore, as shown in FIG. 16B, it is noted that by placing the first end regions 62*a*/62*b* of the second and third electrical lead wires 44*a*/44*b* closer to the front face of the brush 14 than the end regions 47/49 of the first electrical lead wire 46, the terminal ends of the first electrical lead wire 46 (which are facing or directed toward the brush 14) will not be prone to catch on the top edge of the brush holder 16 as the weld splice 50 moves into the interior of the brush holder 16 as the brush 14 wears and diminishes in length. Thus, the end regions 47/49 of the first electrical lead wire 46 are positioned closer to the longitudinal central axis of the brush 14 than the first end regions 62*a*/62*b* of the second and third electrical lead wires 44*a*/44*b*, with the first end regions 62*a*/62*b* of the second and third electrical lead wires 44*a*/44*b* closer to the front edge of the brush 14. In other words, the arrangement of the end regions of the wires 44*a*/44*b*/46 precludes the terminal ends of the first lead wire 46 from obstructing movement of the weld splice 50 into the interior of the brush holder 16, while allowing the end regions 62*a*/62*b* of the second lead wire 44*a* and the third lead wire 44*b* to guide the weld splice 50 into the interior of the brush holder 16.

Further, returning back to FIG. 15, it can be appreciated that the pre-welded arrangement of the end regions of the wires 44*a*/44*b* relative to the terminal ends of the first lead wire 46 (as shown in FIG. 14 with the end regions of the wires 44*a*/44*b* positioned closer to the front edge of the brush than the terminal ends of the first lead wire 46) results in a weld splice 50 that may include a downward facing ledge 63 (e.g., lip, rim, face, etc.) facing toward the top surface of the brush 14, however, the ledge 63 is positioned inward toward the centerline of the brush 14, such that the ledge 63 is prevented from catching on the upper rim of the brush holder 16 as the weld splice 50 moves into the interior of the brush holder 16 as the brush 14 wears and diminishes in length. The downward facing ledge 63 of the weld splice 50 is formed by the terminal ends of the first lead wire 46. As shown in FIG. 15, the terminal ends of the second and third electrical lead wires 44*a*/44*b* also form a ledge 65 (e.g., lip, rim, face, etc.) of the weld splice 50 facing upward away from the brush 14. The orientation of the upward facing ledge 65 will not interfere with movement of the weld splice passing into the interior of the brush holder 16.

Figure 17:
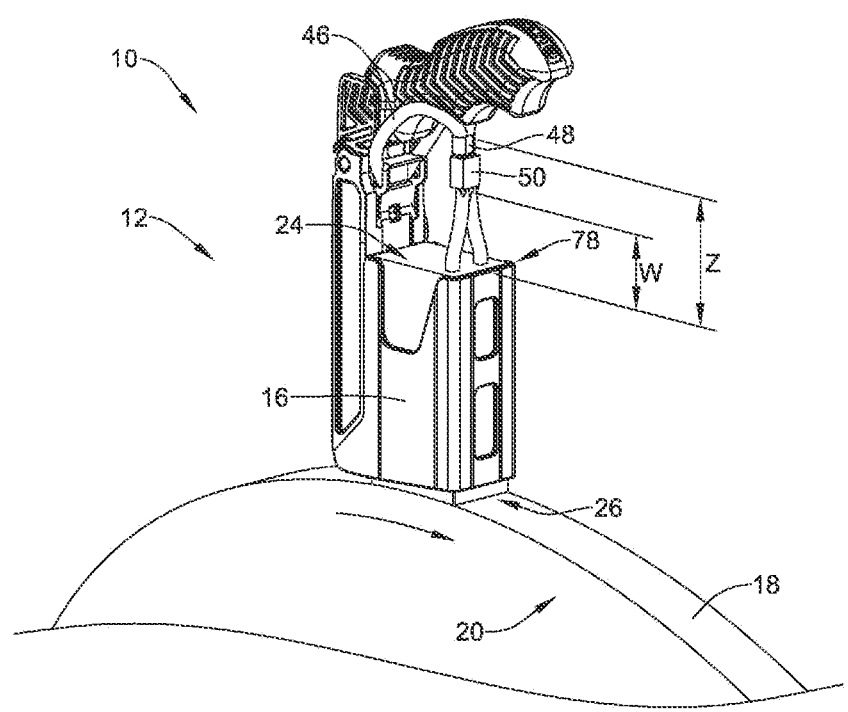
FIG. 17 is an illustrative view of the exemplary brush holder assembly positioned adjacent a rotating component of an electrical machine.

FIG. 17 illustrates the example brush holder assembly 12 described herein positioned along the conductive surface 18 of a rotating component 20 of an electrical machine. FIG. 17 illustrates the brush 14 positioned within the brush holder 16 (as described above with respect to FIG. 1), with the lower surface 26 of the brush 14 engaged with the conductive surface 18 of the rotating component 20. It can be appreciated that as the lower surface 26 maintains contact with the conductive surface 18 of the rotating component 20, the lower surface 26 may wear away, whereby the upper surface 24 of the brush 14 translates linearly within the brush holder 16 toward the conductive surface 18.

In some examples, it may be desirable to monitor the distance for which the upper surface 24 translates within the brush holder 16 to determine the degree of wear of the brush 14. For example, it may be desirable to monitor the distance the upper surface 24 of the brush 14 moves relative to the upper rim 78 of the brush holder 16 or other reference point at a fixed distance from the conductive surface 18. It can be appreciated that the distance the upper surface 24 moves relative to the upper rim 78 of the brush holder 16 (or other fixed reference point) may represent the amount of brush material removed from the lower surface 26 of the brush 14 (i.e., how much the brush 14 has worn or diminished in length during use).

In some examples, it may be difficult to monitor the distance the upper surface 24 moves relative to the upper rim 78 of the brush holder 16. Therefore, in some examples, other components of the brush holder assembly 12, located at a fixed distance from the conductive surface 18, may be utilized as reference points to determine the distance the upper surface 24 of the brush 14 has moved relative to the upper rim 78 of the brush holder 16.

FIG. 17 illustrates that, in some examples, the band 48 (attached to the first electrical lead wire 46 (or the second electrical lead wire 44*a* and/or the third electrical lead wire 44*b*) may be used as a reference point to determine the distance the upper surface 24 of the brush 14 has moved relative to the upper rim 78 of the brush holder 16. For example, FIG. 17 depicts the initial distance the band 48 is from the upper rim 78 as dimension Z at a first temporal occasion. Accordingly, as the lower surface 26 of the brush 14 wears away, the distance Z will decrease. Monitoring the change in distance Z may provide an indication of the amount of brush material removed from the lower surface 26 of the brush 14, and thus how much the brush 14 has worn or diminished in length during use. Once the brush 14 has worn beyond a threshold amount, the brush 14, along with the terminal 42 and associated conductive electrical lead assembly 36 may be removed and replaced with a new brush assembly 45.

Similarly, FIG. 17 illustrates that, in some examples, the weld or splice region 50 may be used as a reference point to determine the distance the upper surface 24 of the brush 14 has moved relative to the upper rim 78 of the brush holder 16. For example, FIG. 17 depicts the initial distance the weld or splice region 50 is from the upper rim 78 as dimension W at a first temporal occasion. Accordingly, as the lower surface 26 of the brush 14 wears away, the distance W will decrease. Monitoring the change in distance W may provide an indication of the amount of brush material removed from the lower surface 26 of the brush 14, and thus how much the brush 14 has worn or diminished in length during use. Once the brush 14 has worn beyond a threshold amount, the brush 14, along with the terminal 42 and associated conductive electrical lead assembly 36 may be removed and replaced with a new brush assembly 45.

Figure 18:
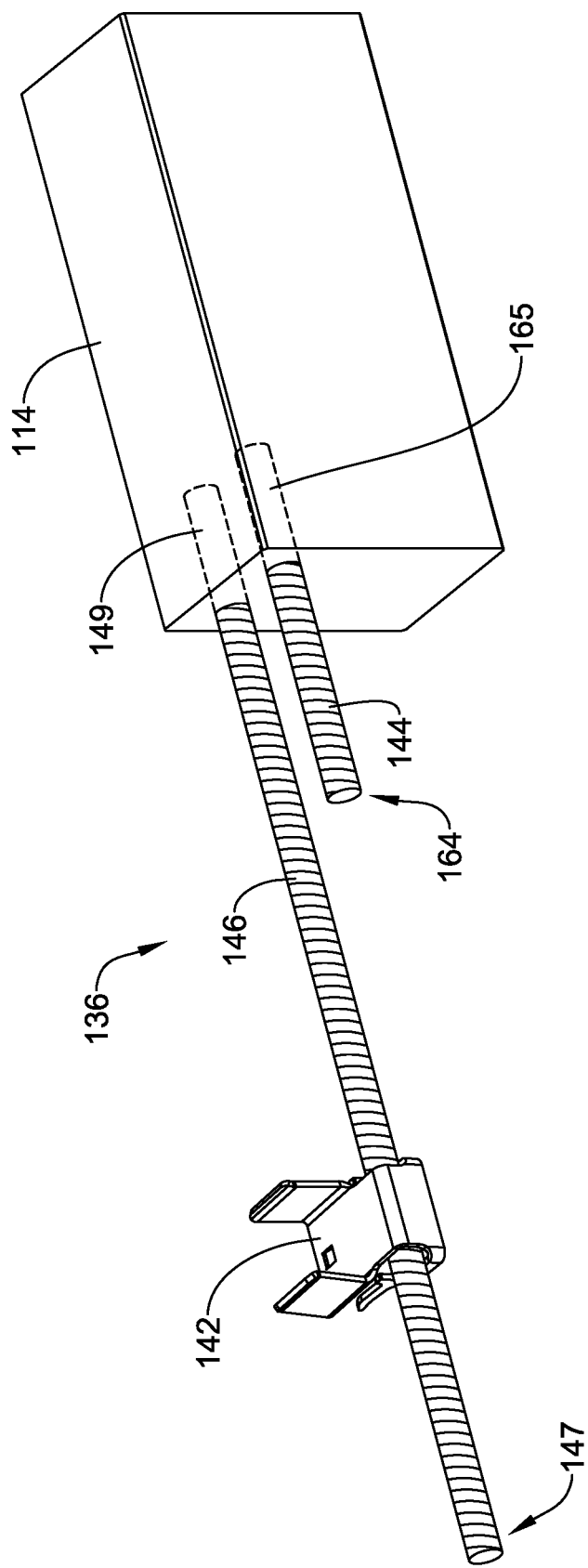
FIG. 18 illustrates a terminal attached to a lead wire of another exemplary brush holder assembly.

In some instances, the brush holder assembly 12 described herein may include an alternative conductive wire assembly having one or more components and/or manufacturing methods that are different from the conductive wire assembly 36 while functioning in a similar fashion as the conductive wire assembly 36. For example, FIG. 18 illustrates various components of another example conductive wire assembly 136 engaged with a brush 114 and extending therefrom. The brush 114 may be similar in form and function to the brush 14 described herein.

FIG. 18 illustrates an example manufacturing step in which a first electrical lead wire 146 and a second electrical lead wire 144 have previously been secured to the brush 114. FIG. 18 illustrates that the first electrical lead wire 146 may include a first end region 147, a second end region 149, and a medial region extending between the first end region 147 and the second end region 149. The second electrical lead wire 144 may include a first end region 164 and a second end region 165. Additionally, it can be appreciated from FIG. 18 that, prior to being welded together (which occurs in a subsequent manufacturing step), the first electrical lead wire 146 may be longer than the second electrical lead wire 144. In other words, the first electrical lead wire 146 may have a first length measured from the upper surface of the carbon brush 114 to the free end of the first electrical lead wire 146 at the first end region 147, and the second electrical lead wire 144 may have a second length measured from the upper surface of the carbon brush 114 to the free end of the second electrical lead wire 144 at the first end region 164. The first length may be greater than the second length.

The first electrical lead wire 146 (e.g., the second end region 149 of the first electrical lead wire 146) and/or the second electrical lead wire 144 (e.g., the second end region 165 of the second electrical lead wire 144) may be secured to the carbon brush 114 in any desired fashion. Attaching the first electrical lead wire 146 and/or the second electrical lead wire 144 to the brush 114 may include positioning each of the first electrical lead wire 146 and the second electrical lead wire 144 into a respective cavity (e.g., a pre-formed hole, bore and/or aperture) in the brush 114, whereby after placing the second end region 149 of the first lead wire 146 and the second end region 165 of the second lead wire 144 into its respective cavity in the brush 114, each of the individual cavities is filled (e.g., packed) with additional powder material (e.g., carbon powder material), thereby securing the second end regions 149/165 of both the first electrical lead wire 146 and the second electrical lead wire 144 to the brush 114. Similar to that shown in FIG. 12, the embedded second end regions 149/165 of the first electrical lead wire 146 and the second electrical lead wire 144 in the brush 114 are depicted by the dashed lines of FIG. 18. In other words, FIG. 18 illustrates that the brush 114 may include two or more separate electrical lead wires extending from the brush 114, with an end region of each of the separate lead wires embedded in, or otherwise secured to the brush 114. As will be described below, the free, opposite first ends 147/164 of the first lead wire 146 and the second lead wire 144, respectively, may extend from the brush 114 to be secured to each other at a splice region 150 (shown in FIG. 21).

Similar to that illustrated in FIG. 12 above, FIG. 18 illustrates that the respective second ends 149/165 of the first electrical lead wire 146 and the second electrical lead wire 144 may be spaced away from one another at the point at which each segment of the first electrical lead wire 146 and the second electrical lead wire 144 exit the brush 114.

Further, FIG. 18 illustrates that prior to welding the first end region 147 of the first electrical lead wire 146 to the first end region 164 of the second electrical lead wire 144, a terminal 142 may be attached (e.g., welded) to the medial region of the first electrical lead wire 146 at a location between the first end region 147 and the second end region 149 such that the first end region 147 of the first electrical lead wire 146 extends from a first side of the terminal 142 and the second end region 149 of the first electrical lead wire 146 extends from a second, opposite side of the terminal 142. It can be appreciated that the terminal 142 may be similar in form and function to the terminal 42 described herein. Additionally, FIG. 18 illustrates that, in some instances, the terminal 142 may be welded along the first electrical lead wire 146 at a position whereby the terminal 142 is closer to the first end region 147 than the second end region 149 (embedded in the brush 114) of the first electrical lead wire 146. In other words, the terminal 142 may be welded to the medial region of the first electrical lead wire 146 such that a longer length of the first electrical lead wire 146 extends between the terminal 142 and the carbon brush 114 than the length of the first electrical lead wire 146 extending from the terminal 142 to the free end (at the first end region 147) of the first electrical lead wire 146.

It can be appreciated that the terminal 142 shown in FIG. 18 may be attached to the first electrical lead wire 146 after the second end region 149 of the first electrical lead wire 146 is inserted and attached to the brush 114 and prior to the first end region 147 of the first electrical lead wire 146 being welded to the first end region 164 of the second electrical lead wire 144. For example, it can be appreciated that prior to achieving the configuration illustrated in FIG. 18, the first electrical wire 146 may have been inserted through openings of the terminal 142 (e.g., similar to the openings 57a/57b of terminal 42), whereby the terminal 142 was then properly aligned along the medial region of the first electrical lead wire 146. For example, as shown in FIG. 18, the terminal 142 may have been generally positioned closer to the first end region 147 of the first electrical lead wire 146 with a generally shorter length of the first electrical lead wire 146 extending from the side of the terminal 142 farther from the brush 114 and a longer length of the first electrical lead wire 146 extending from the side of the terminal 142 closer to the brush 114.

After positioning the terminal 142 at the desired position along the lead wire 146, the first electrical lead wire 146 may be welded or otherwise secured to the terminal 142. The attachment of the terminal 142 to the first lead wire 146 may be performed using a process similar to that described above with respect to attaching the terminal 42 and lead wire 46 in FIGS. 8-9. Welding or otherwise securing the terminal 142 to the first lead wire 146 may be performed prior to or after attaching the first lead wire 146 and/or the second lead wire 144 to the brush 114.

Figure 19:
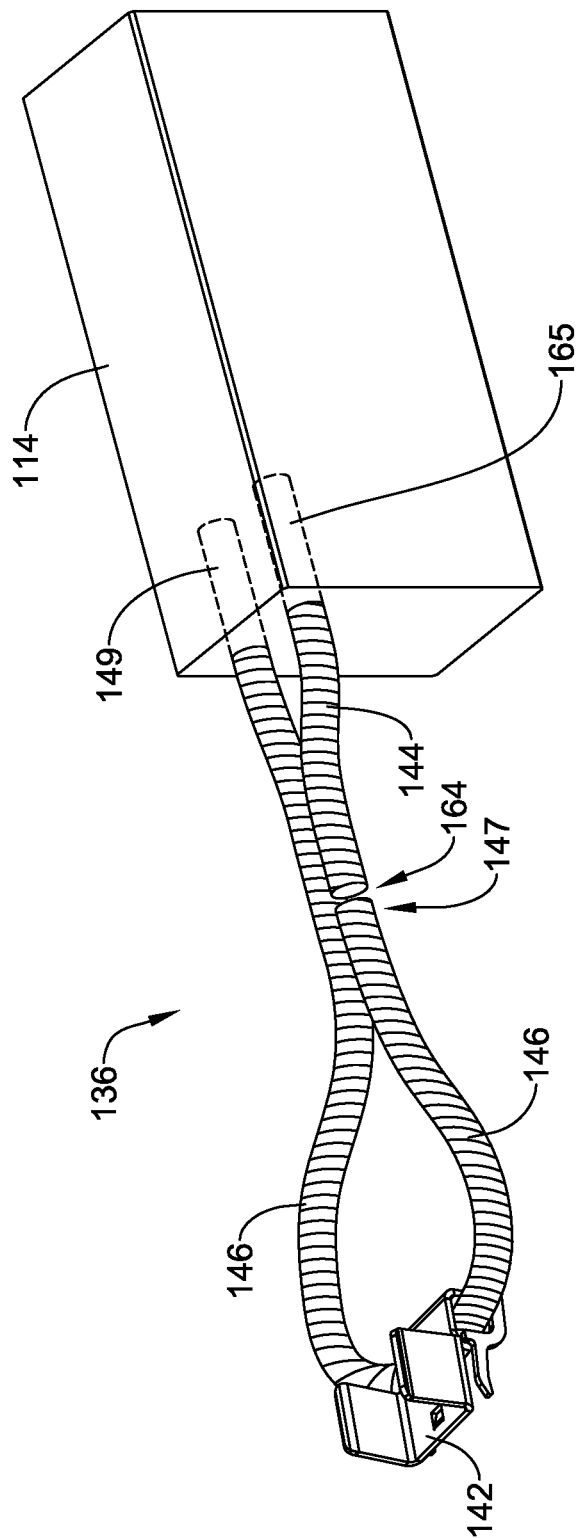
FIG. 19 illustrates the lead wires of the exemplary brush holder assembly shown in FIG. 18 prior to being secured together.

FIG. 19 illustrates another example manufacturing step in forming the electrically conductive electrical assembly 136. Specifically, FIG. 19 illustrates a manufacturing step in which the first electrical lead wire 146 is bent such that the first end region 147 of the first electrical lead wire 146 is positioned adjacent to the first end region 164 of the second electrical lead wire 144 with the free end of the first electrical lead wire 146 adjacent the free end of the second electrical lead wire 144. FIG. 19 illustrates that the first electrical lead wire 146 may be curved in a manner such that the first electrical lead wire 146 forms a loop. FIG. 19 illustrates that when the first electrical wire 146 is formed into a loop, the terminal 142 is positioned such that it is generally aligned at an apex of the loop formed opposite the brush 114.

Additionally, it can be appreciated from FIG. 19 that portions of both the first electrical lead wire 146 and the second electrical lead wire 144 may be brought adjacent to one another (e.g., the free ends of the first and second electrical lead wires 146/144). For example, FIG. 19 illustrates the first electrical lead wire 146 and the second electrical lead wire 144 may converge and curve toward a centerline of the brush 114, whereby the first electrical lead wire 146 and the second electrical lead wire 144 are positioned next to one another prior to being welded together.

Figure 20:
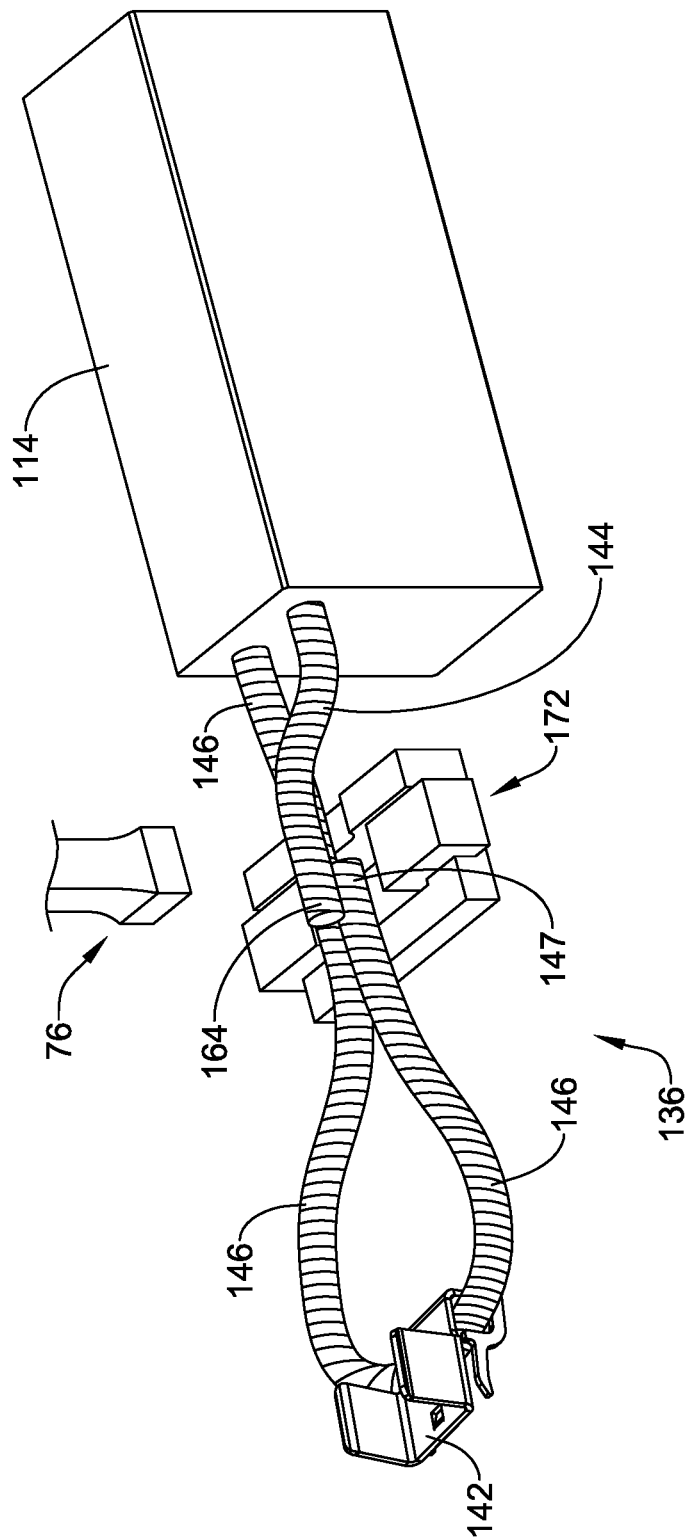
FIG. 20 illustrates the lead wires of the exemplary brush holder assembly shown in FIG. 19 positioned along an exemplary fixture prior to being secured together.
Figure 21:
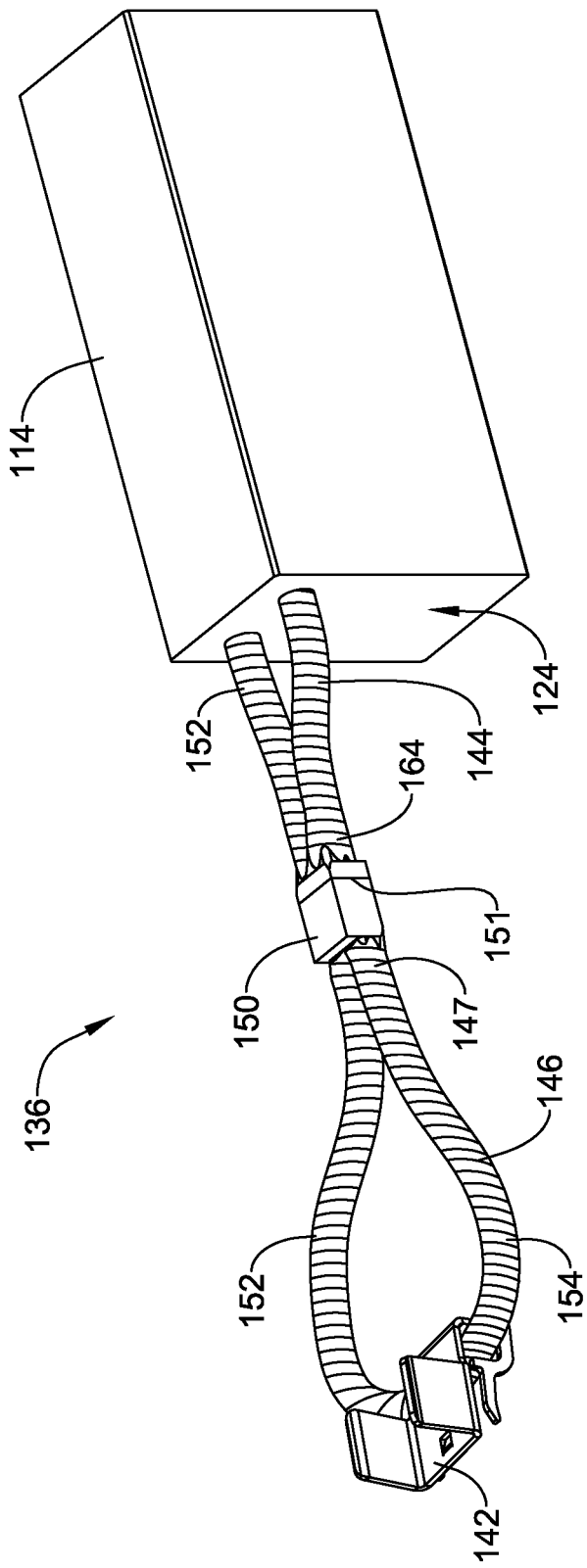
FIG. 21 illustrates the lead wires of the brush holder assembly shown in FIG. 20 after being secured together.

FIG. 20 and FIG. 21 illustrate example manufacturing steps which may be similar to the manufacturing steps described with respect to FIG. 14 and FIG. 15. For example, FIG. 20 illustrates the first end region 147 of the first electrical lead wire 146 (including the free end of the first electrical lead wire 146) and the first end region 164 of the second electrical lead wire 144 (including the free end of the second electrical lead wire 144) positioned within a welding zone prior to welding via the welding device 76. In some instances, a medial portion of the first electrical lead wire 146 may also be positioned within the welding zone juxtaposed with the first end region 147 of the first electrical lead wire 144 and the first end region 164 of the second electrical lead wire 146. For example, FIG. 20 illustrates the first end region 147 of the first electrical lead wire 146, the first end region 164 of the second electrical lead wire 144 and a medial portion of the first electrical lead wire 146 held in pre-welded alignment by a fixture 172. It can be appreciated that the fixture 172 may be similar in form and function to the fixture 72 described herein.

FIG. 20 further illustrates that the first end region 164 of the second electrical lead wire 144 (the second end region 165 of the second electrical lead wire 144 having been previously secured to the brush 114) overlapping (i.e., positioned vertically above and overlapping) the first end region 147 of the first electrical lead wire 146 (the second end region 149 of the first electrical lead wire 146 having been previously secured to the brush 114). In such a configuration, the first end region 164 of the second electrical lead wire 144 may be positioned overtop the first end region 147 of the first electrical lead wire 146. In other words, the first end region 147 of the first electrical lead wire 146 is positioned underneath the first end region 164 of the second electrical lead wire 144. Similar to that described herein with respect to the fixture 72, it can be appreciated that the fixture 172 may be designed to position the first end region 147 of the first electrical lead wire 146 underneath the second end region 164 of the second lead wire 144 prior to welding the lead wires together. Thus, FIG. 20 illustrates that, in some examples, prior to welding, the first end region 147 of the first electrical lead wire 146 may overlap (e.g., extend beyond) a portion of the first end region 164 of the second electrical lead wire within the welding zone of the welding device 76.

FIG. 20 further illustrates that prior to welding the first end region 147 of the first electrical lead wire 146 to the first end region 164 of the second electrical lead wire 144, and optionally the medial region of the first electrical lead wire 146 to the first end regions 147/164 of the first and second electrical lead wires 146/144, the first electrical lead wire 146 may be attached to (e.g., welded to) the terminal 142 (as described above) and the first electrical lead wire 146 and the second electrical lead wire 144 may be attached to (e.g., embedded in) the brush 114. The fixture 172 may be designed to permit the welding of the first end region 147 of the first electrical lead wire 146, the first end region 164 of the second electrical lead wire 144 and/or the medial region of the first electrical lead wire 146 together after the first electrical lead wire 146 has been attached to the terminal 142 and the first electrical lead wire 146 and/or the second electrical lead wire 144 have been attached to the brush 114.

Once the first end region 147 of the first electrical lead wire 146, the first end region 164 of the second electrical lead wire 144 and/or the medial region of the first electrical lead wire 146 are aligned in the fixture 172, the welding device 76, such as an ultrasonic welder, may be advanced toward the first end region 147 of the first electrical lead wire 146, the first end region 164 of the second electrical lead wire 144 and/or the medial region of the first electrical lead wire 146 to ultrasonically weld the end regions 147/164 together to form a spliced union. During the welding process, the first end region 147 of the first electrical lead wire 146 may be welded to the first end region 164 of the second electrical lead wire 144. Additionally, in some instances, a portion of the medal region of the first electoral lead wire 146 juxtaposed with the first end regions 147/164 of the first and second electrical lead wires 146/144 may be welded to the first end region 147 of the first electrical lead wire 146 and/or the first end region 164 of the second electrical lead wire 144. The process of welding the first end region 147 of the first electrical lead wire 146, the first end region 164 of the second electrical lead wire 144 and/or the medial region of the first electrical lead wire 146 may be similar to the welding process described with respect to FIG. 14 and FIG. 15 above.

FIG. 21 illustrates the first end region 147 of the first electrical lead wire 146, the first end region 164 of the second electrical lead wire 144 and the medial region of the first electrical lead wire 146 after they have all been welded together by the welding device 76 (shown in FIG. 20) to form a spliced union 150 (e.g., spliced junction, welded junction) along the conductive lead assembly 136. The spliced union 150 may be referred to as a welded union, welded region, welded junction, etc. which results from splicing (e.g., ultrasonic welding) together the first end region 147 of the first electrical wire lead 146, the first end region 164 of the second electrical wire lead 144, and optionally a portion of the medial region of the first electrical wire lead 146. It is noted that in some instances, the welded, or spliced region 150 may be formed with only welding the first end region 147 of the first electrical lead wire 146 to the first end region 164 of the second electrical lead wire 144. It can be appreciated that the assembly shown in FIG. 21 illustrates the conductive lead assembly 136 whereby the first electrical lead wire 146 is directly attached to the terminal 142 and a first portion 152 of the first electrical lead wire 146 extends continuously from the terminal 142 to the brush 114 through the welded or spliced union or region 150 while a second portion 154 of the first electrical lead wire 146 extends from the terminal 142 and terminates at the welded or spliced union or region 150. The second electrical lead wire 144, which is directly attached to the brush 114, extends from the brush 114 and terminates at the welded or spliced union or region 150. Thus, the first portion 152 of the first electrical lead wire 146 may be directly attached to the brush 114 and extend all the way to the terminal 142 through the spliced union 150 while the second portion 154 of the first electrical lead wire 146 may be directly attached to the terminal 142, but not extend all the way to the brush 114 (i.e., terminate at the spliced union 150). Furthermore, the second electrical lead wire 144 may only extend between the weld splice 150 and the brush 114.

Additionally, FIG. 21 illustrates that some examples of the conductive lead assembly 136 may include a wear mark 151 placed along one or more surfaces of the weld splice 150. The wear mark 151 may be etched into the weld splice 150, imprinted, applied as an ink, or otherwise applied or formed on the weld splice 150. The wear mark 151 may be placed at a given distant from the upper surface of the brush 114. For example, the wear mark 151 may be placed at approximately 1.5 inches from the upper surface of the brush 114 with the conductive lead assembly 136 extending away from the upper surface of the brush 114. As will be described in greater detail below, the wear mark 151 may permit a visual indication of the amount wear or diminution of the brush 114 during use.

It can be appreciated that the conductive lead assembly 136 illustrated in FIG. 21 may be integrated with the remaining components of the brush holder assembly 12 (e.g., the brush holder 16, the lower beam 32, the upper beam 30 and handle 22) described above.

Figure 22:
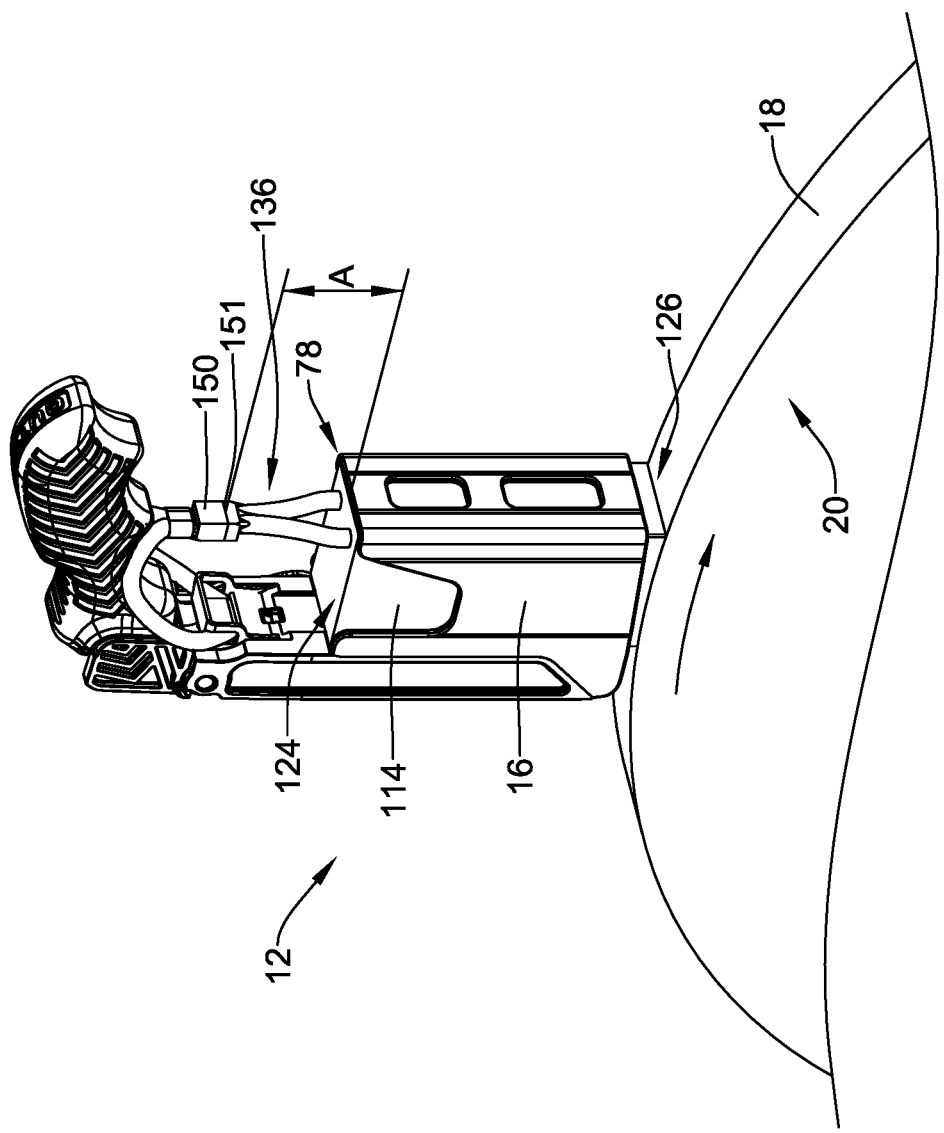
FIG. 22 is an illustrative view of the exemplary brush holder assembly shown in FIG. 21 positioned adjacent a rotating component of an electrical machine.

FIG. 22 illustrates the example electrically conductive lead assembly 136 integrated with the brush holder assembly 12, whereby the brush holder assembly 12 is positioned along the conductive surface 18 of a rotating component 20 of an electrical machine. For example, FIG. 22 illustrates the brush 114 positioned within the brush holder 16 (similar to that described above with respect to FIG. 1), with a lower surface 126 of the brush 114 engaged with the conductive surface 18 of the rotating component 20. It can be appreciated that as the lower surface 126 maintains in contact with the conductive surface 18 of the rotating component 20, the lower surface 126 may wear away, whereby the upper surface 124 of the brush 114 translates linearly within the brush holder 16 toward the conductive surface 18.

As described herein, it may be desirable to monitor the distance for which the upper surface 124 of the brush 114 translates within the brush holder 16 to determine the degree of wear of diminution in length of the brush 114. For example, it may be desirable to monitor the distance the upper surface 124 of the brush 114 moves relative to the upper rim 78 of the brush holder 16 or other reference point at a fixed distance from the conductive surface 18. It can be appreciated that the distance the upper surface 124 moves relative to the upper rim 78 of the brush holder 16 (or other fixed reference point) may represent the amount of brush material removed from the lower surface 126 of the brush 114 (i.e., how much the brush 114 has worn or diminished in length during use).

FIG. 22 illustrates that, in some examples, the wear mark 151 along the splice region 150 may be used as a reference point to determine the distance the upper surface 124 of the brush 114 has moved relative to the upper rim 78 of the brush holder 16. For example, FIG. 22 depicts the initial distance the wear mark 151 is from the upper rim 78 as dimension A at a first temporal occasion. Accordingly, as the lower surface 126 of the brush 114 wears away, the distance A will decrease. Monitoring the change in distance A may provide an indication of the amount of brush material removed from the lower surface 126 of the brush 114, and thus how much the brush 114 has worn or diminished in length during use. Once the brush 114 has worn beyond a threshold amount, the brush 114, along with the terminal 142 and associated conductive electrical lead assembly 136 may be removed and replaced with a new brush assembly.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A brush assembly, comprising:
 a carbon brush having an upper surface and a lower surface;
 a first lead wire including a first end region, a second end region and a medial region located between the first end region of the first lead wire and the second end region of the first lead wire, wherein the first lead wire extends continuously from the first end region of the first lead wire to the second end region of the first lead wire;
 a second lead wire including a first end region and a second end region; and
 an electrically conductive terminal attached to the first lead wire with the first and second end regions of the first lead wire extending away from the electrically conductive terminal;
 wherein the first lead wire is coupled to the second lead wire at a spliced union, and wherein the spliced union is located between the electrically conductive terminal and the carbon brush, and wherein the spliced union is spaced away from both the electrically conductive terminal and the carbon brush;
 wherein the second end region of the first lead wire and the second end region of the second lead wire are secured to the carbon brush; and
 wherein the spliced union is formed by welding a portion of the medial region of the first lead wire to both the first end region of the first lead wire and the first end region of the second lead wire.

2. The brush assembly of claim 1, wherein the first lead wire extends from the electrically conductive terminal to the spliced union, and the second lead wire extends from the carbon brush to the spliced union.

3. The brush assembly of claim 1, wherein the electrically conductive terminal is secured to the medial region of the first lead wire.

4. The brush assembly of claim 1, wherein the spliced union includes a wear mark, wherein the wear mark is utilized as a reference point to determine diminution of wear of the carbon brush.

5. The brush assembly of claim 1, wherein:
 the electrically conductive terminal includes an inner core layer positioned between a first conductive metal layer and a second conductive metal layer;
 the inner core layer includes steel; and
 wherein the first conductive metal layer, the second conductive metal layer or both the first conductive metal layer and the second conductive metal layer includes copper.

6. The brush assembly of claim 1, wherein the first lead wire forms a looped portion extending away from the spliced union, the looped portion located between the first end region of the first lead wire and the medial region of the first lead wire.

7. The brush assembly of claim 6, wherein the electrically conductive terminal is secured along the looped portion of the first lead wire.

8. A method of manufacturing a brush assembly, the method including:
 welding a first end region and a medial region of a first lead wire to a first end region of a second lead wire, wherein the first lead wire was previously secured to an electrically conductive terminal and the second lead wire was previously secured to a carbon brush prior to the welding step;
 wherein the welding forms a spliced union between the first lead wire and the second lead wire, the spliced union located at a location between and spaced away from the carbon brush and the electrically conductive terminal;
 wherein the electrically conductive terminal is secured to the first lead wire between the first end region of the first lead wire and the medial region of the first lead wire.

9. The method of claim 8, wherein prior to securing the first lead wire to the electrically conductive terminal:
 a second end region of the first lead wire is embedded in a top surface of the brush at a first location; and
 a second end region of the second lead wire is embedded in the top surface of the brush at a second location.

10. The method of claim 9, wherein the electrically conductive terminal is secured along the medial region of the first lead wire.

11. The method of claim 10, wherein the first lead wire is longer than the second lead wire and the electrically conductive terminal is secured along the medial region of the first lead wire at a location closer to the first end region of the first lead wire than to the second end region of the first lead wire.

12. A brush holder assembly for positioning a conductive carbon brush in contact with a conductive surface of an electrical device, comprising:
- a brush holder including a brush box and a beam secured thereto;
- a carbon brush slidably disposed in the brush box;
- an electrically conductive terminal releasably attached to the beam of the brush holder;
- a first lead wire secured to the electrically conductive terminal; and
- a second lead wire secured to the carbon brush and extending therefrom;
- wherein both a first end region and a medial region of the first lead wire is are secured to a first end region of the second lead wire at a spliced union with a looped portion of the first lead wire extending from the spliced union, the spliced union positioned between and spaced away from the carbon brush and the electrically conductive terminal;
- wherein the electrically conductive terminal is secured to the looped portion of the first lead wire between the first end region of the first lead wire and the medial region of the first lead wire.

13. The brush holder assembly of claim 12, wherein the first end region and the medial region of the first lead wire is ultrasonically welded to the first end region of the second lead wire at the spliced union.

14. The brush holder assembly of claim 12, wherein the electrically conductive terminal is secured along the medial region of the first lead wire.

15. The brush holder assembly of claim 14, wherein the first lead wire is longer than the second lead wire and the electrically conductive terminal is secured along the medial region of the first lead wire at a location closer to the first end region of the first lead wire than to the second end region of the first lead wire.

16. A brush assembly, comprising:
- a carbon brush having an upper surface and a lower surface;
- an electrically conductive terminal, the electrically conductive terminal includes an inner core layer positioned between a first conductive metal layer and a second conductive metal layer; wherein the electrically conductive terminal includes an exposed edge showing the first conductive metal layer, the second conductive metal layer and the inner core, wherein the first conductive metal layer extends conterminously over an entirety of an upper surface of the inner core layer, and the second conductive metal layer extends conterminously over an entirety of a lower surface of the inner core layer; and
- an electrically conductive lead assembly attached to both the carbon brush and the electrically conductive terminal.

17. The brush assembly of claim 16, wherein the electrically conductive lead assembly is directly welded to the first conductive metal layer of the electrically conductive terminal.

18. The brush assembly of claim 16, wherein:
- the inner core layer includes steel; and
- the first conductive metal layer, the second conductive metal layer or both the first conductive metal layer and the second conductive metal layer includes copper.

* * * * *